United States Patent [19]

Lohneis et al.

[11] 4,013,176

[45] Mar. 22, 1977

[54] UNITARY WORK CHANGER FOR A MACHINING CENTER

[75] Inventors: Earl R. Lohneis, Milwaukee; John J. Schachte, Wauwatosa, both of Wis.

[73] Assignee: Kearney & Trecker Corporation, West Allis, Wis.

[22] Filed: Dec. 4, 1972

[21] Appl. No.: 311,851

Related U.S. Application Data

[63] Continuation of Ser. No. 12,057, Feb. 17, 1970, abandoned.

[52] U.S. Cl. .......................... 214/1 BD; 214/1 BC; 82/2.7
[51] Int. Cl.² ............................................. B25J 3/00
[58] Field of Search .................... 214/1 BC, 29 CM

[56] References Cited

UNITED STATES PATENTS

| | | | |
|---|---|---|---|
| 3,054,333 | 9/1962 | Brainard et al. | 90/56 |
| 3,241,380 | 3/1966 | Howing | 214/1 BC |
| 3,255,861 | 6/1966 | Fritz | 214/1 BC |

Primary Examiner—Leonidas Vlachos
Attorney, Agent, or Firm—Cyril M. Hajewski

[57] ABSTRACT

This invention relates to a greatly simplified workpiece changer mechanism in combination with a simplified tool storage and changing mechanism for a machine tool. To accomplish this, a rotatable work carrying spindle is adapted to support a workpiece for selective rectilinear movement relative to an associated rotary cutting tool, and to support the same workpiece for selective rotational movement relative to a rectilinearly movable cutting tool carried by the same spindle. The work receiving spindle is mounted in spaced apart relationship to a storage support adapted to releasably carry a workpiece for selective interchange with a workpiece carried by the work spindle. To effect a selective interchange of workpieces between the work spindle and the storage support, a work transfer arm is pivotally supported between the work spindle and the work support. At its opposite ends, the work transfer arm is provided with oppositely extending openings respectively adapted to receive work support rings of like size and configuration. The arrangement is such that the transfer arm pivots 90° in one direction for moving the oppositely disposed openings presented thereby into clamping engagement with the workpieces respectively carried by the work spindle and the storage member. Automatic clamping means respectively associated with the work receiving openings are disposed to be actuated into clamped engagement with the workpieces for retaining them in predetermined angularly clamped positions during the interchange. Next, the work spindle and support member are retracted from engagement with the respective work supports, and the transfer arm rotated through another 180° for respectively realigning the work supports in interchanged position with the work spindle and the support member respectively. The latter are moved forward into clamping reengagement with the now interchanged work supports. The transfer arm clamping means are then released and the transfer arm pivotally moved 90° in the opposite direction to return the transfer arm to its central parked position. To accelerate controlled movement of the work transfer arm, a velocity control system is provided in combination with automatic clamping means for retaining work support rings in clamped engagement within the oppositely disposed openings provided in the transfer member.

3 Claims, 26 Drawing Figures

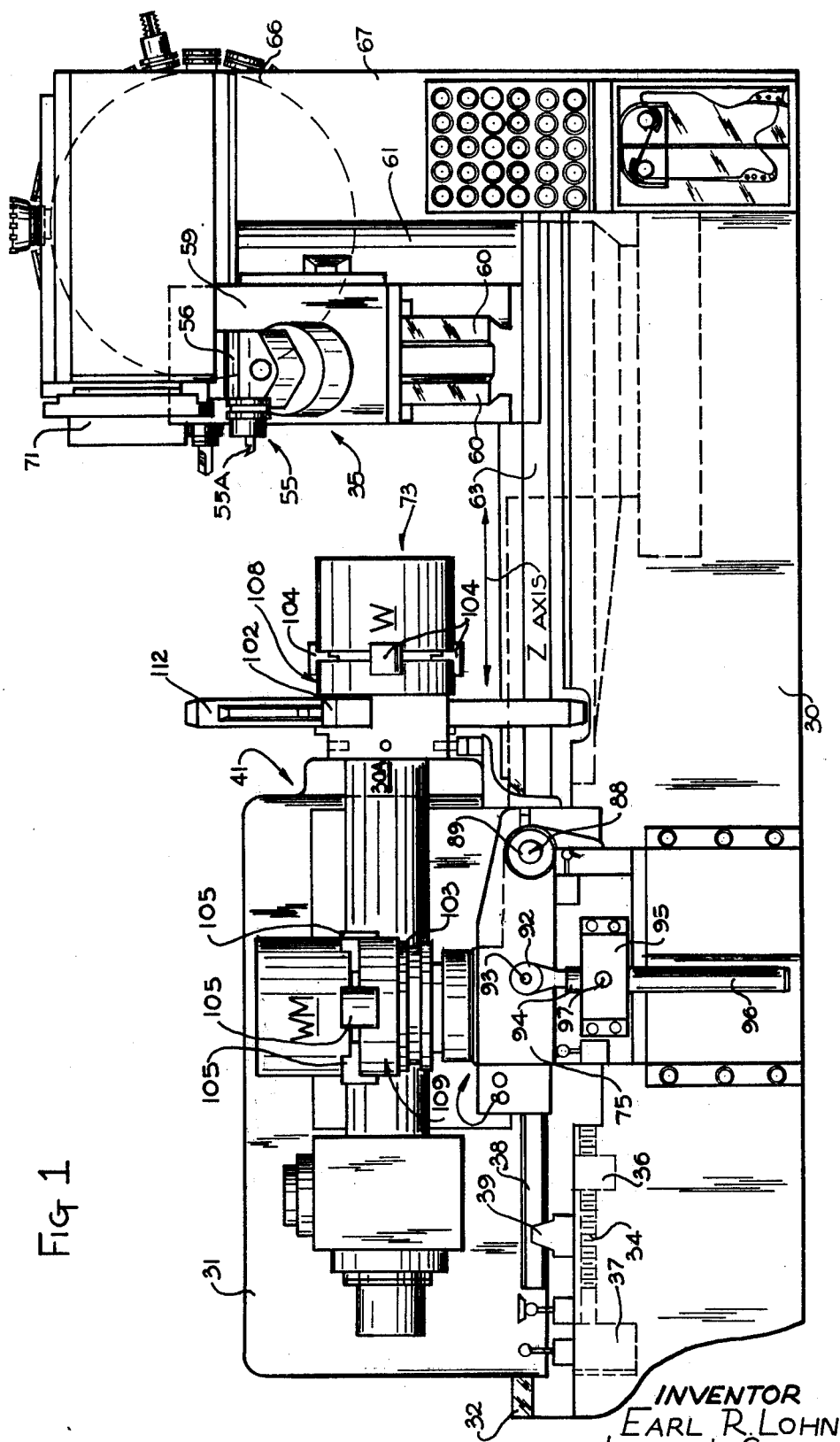

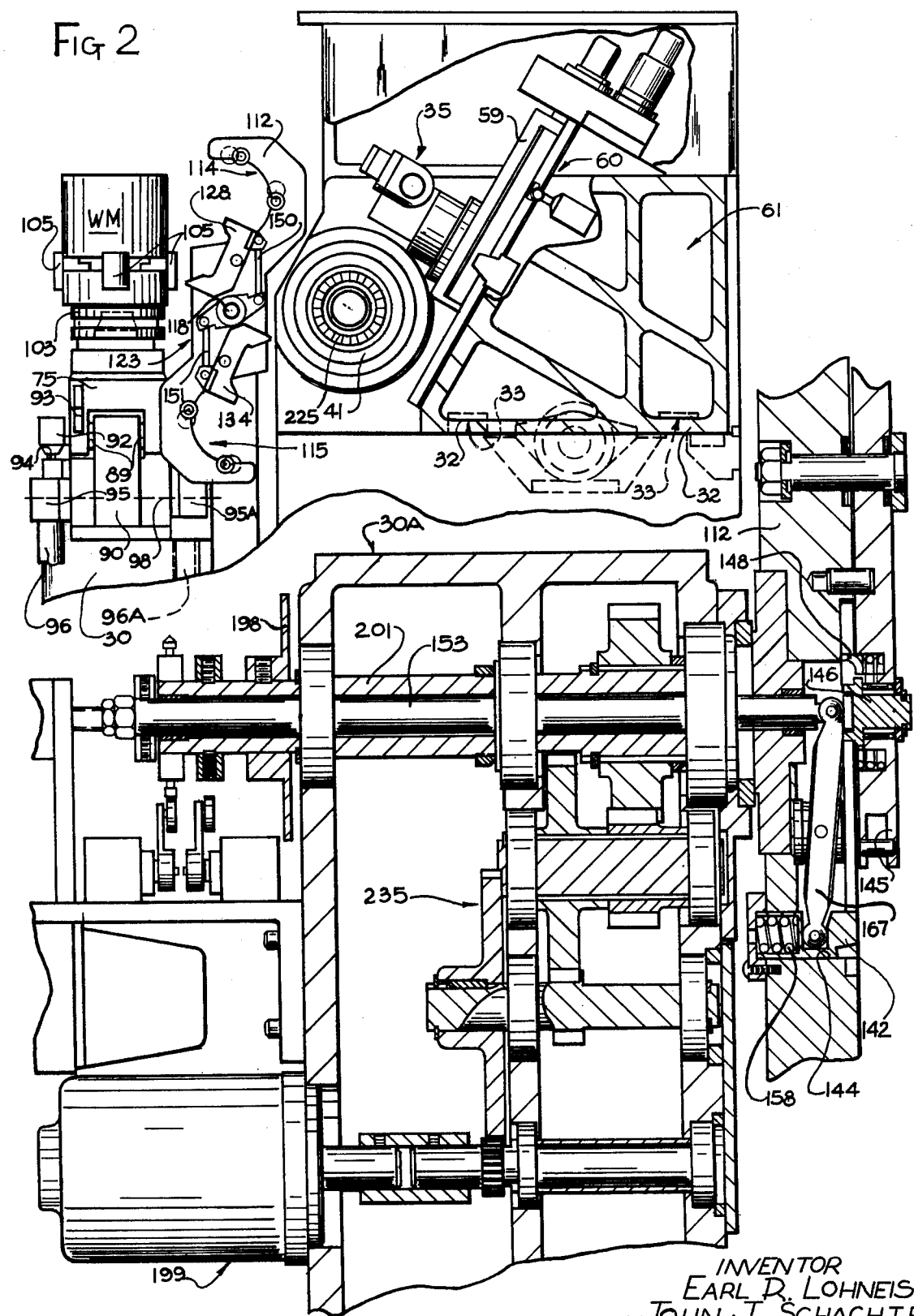

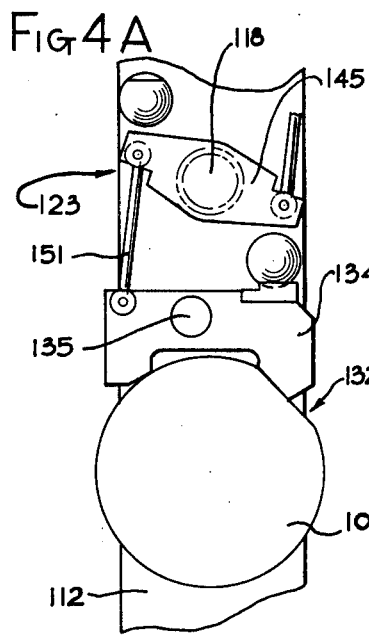
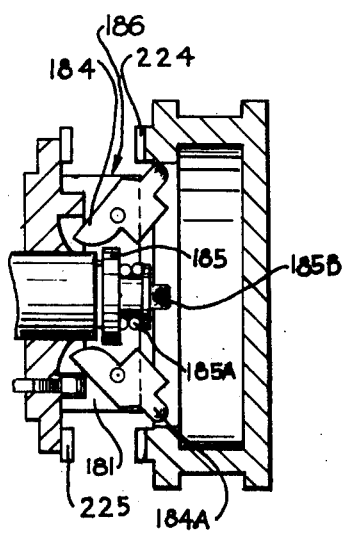
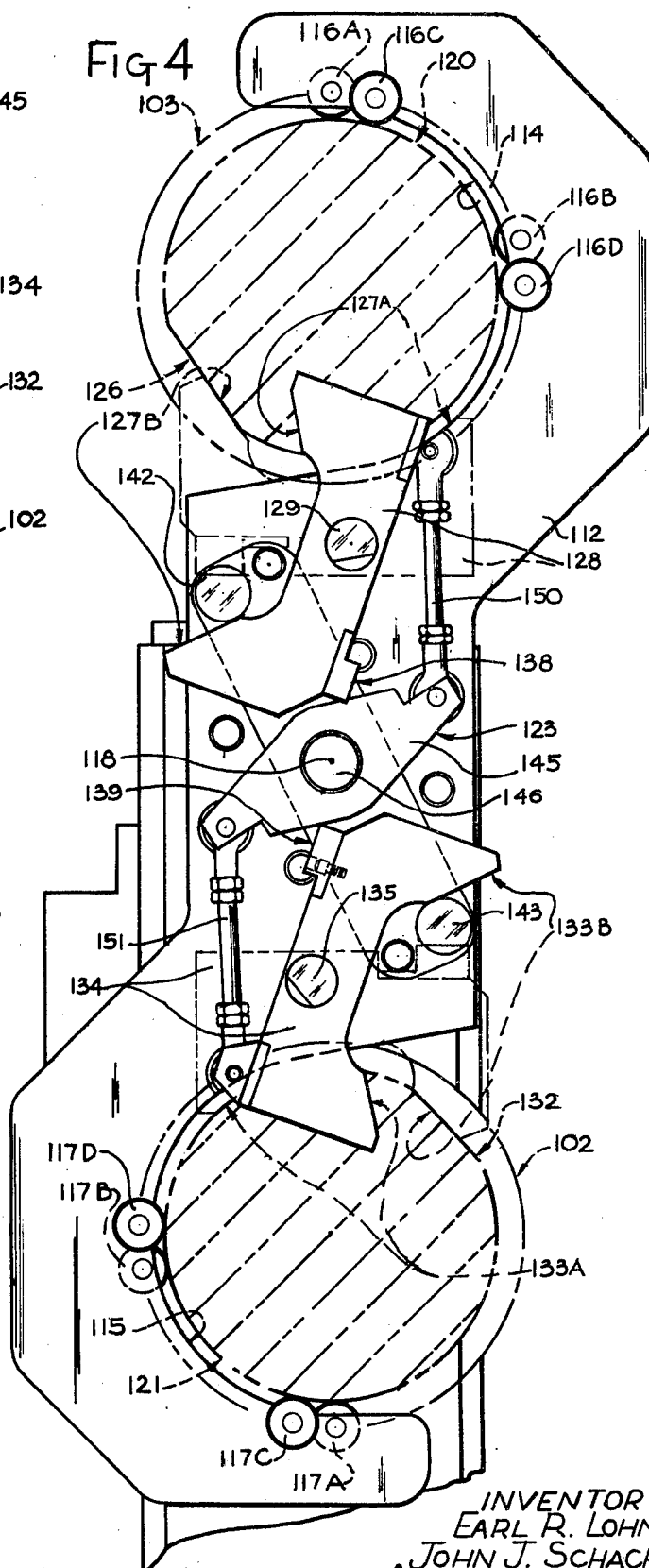

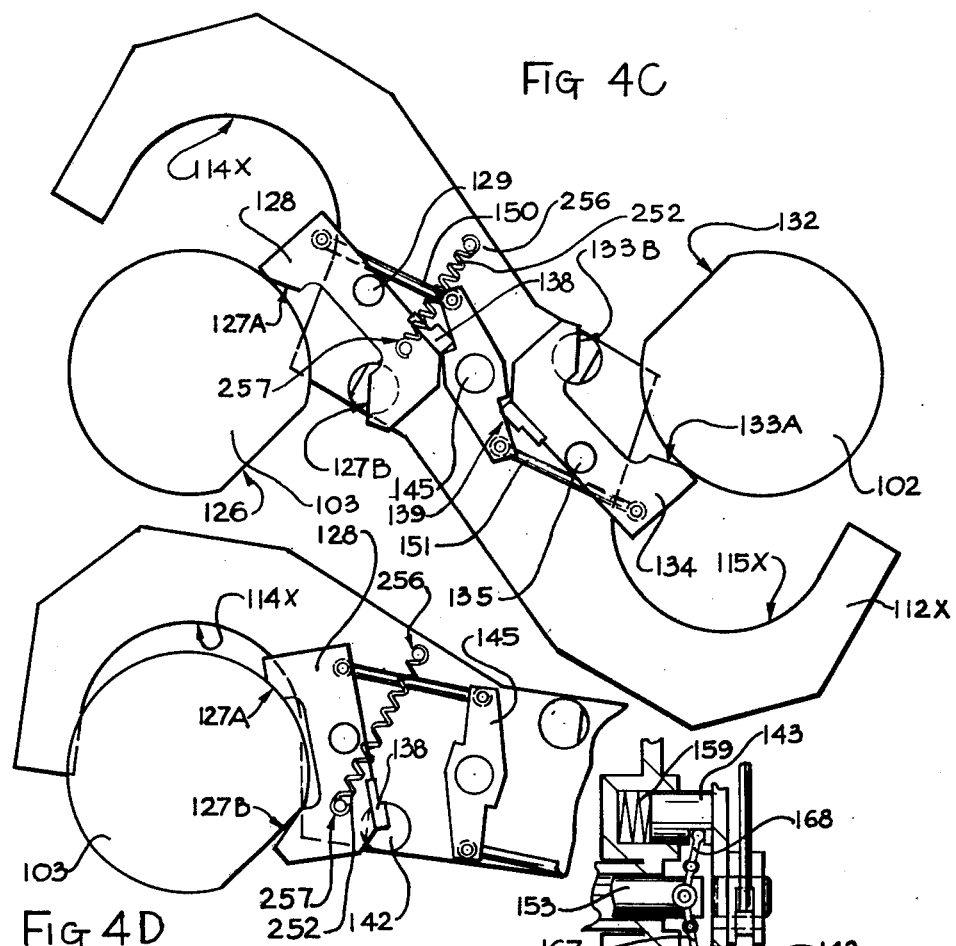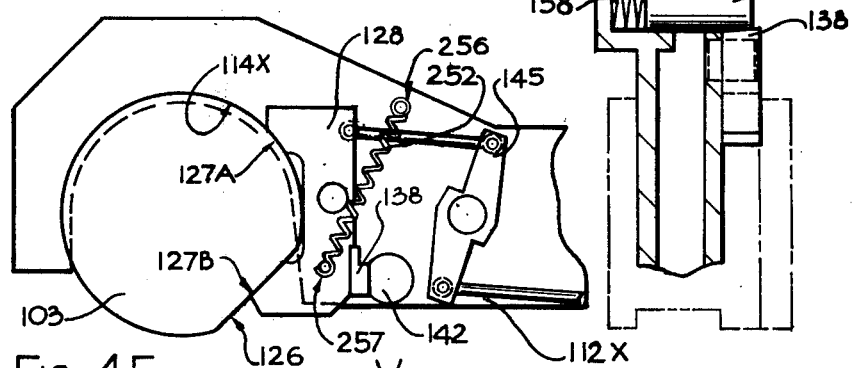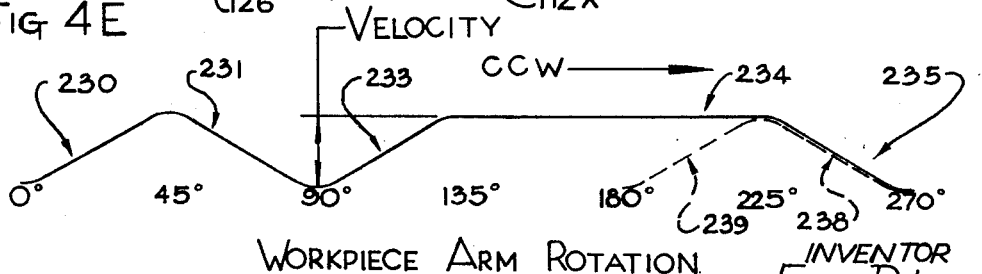

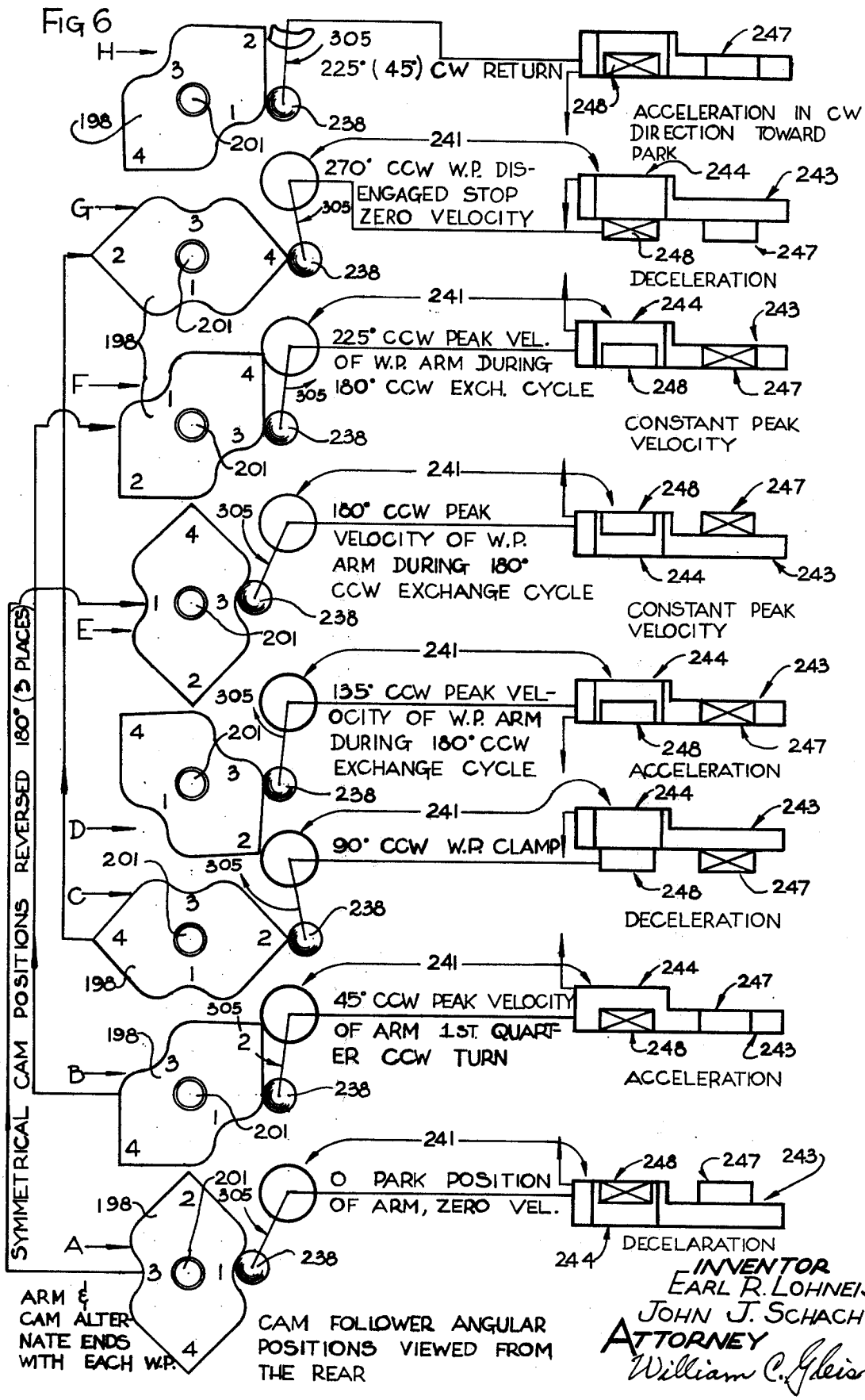

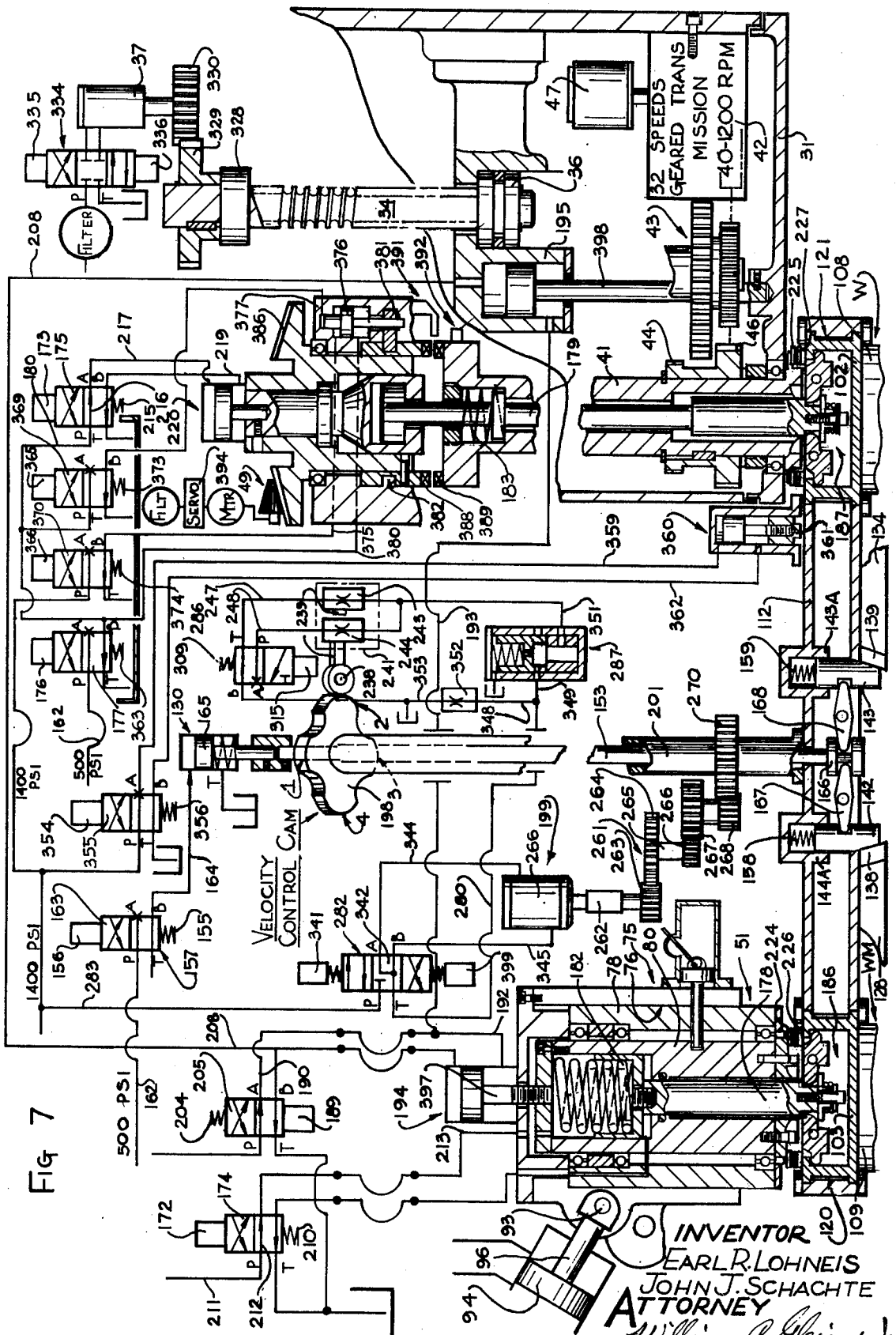

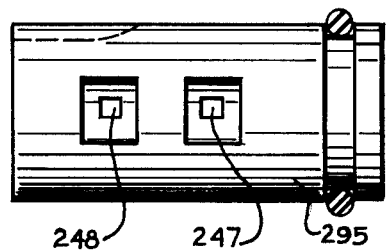
FIG 8C
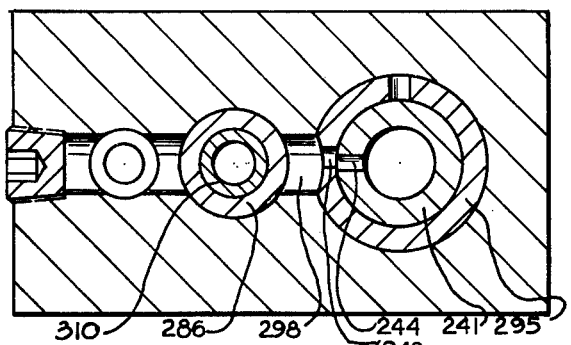
VIEW A-A  FIG 8B
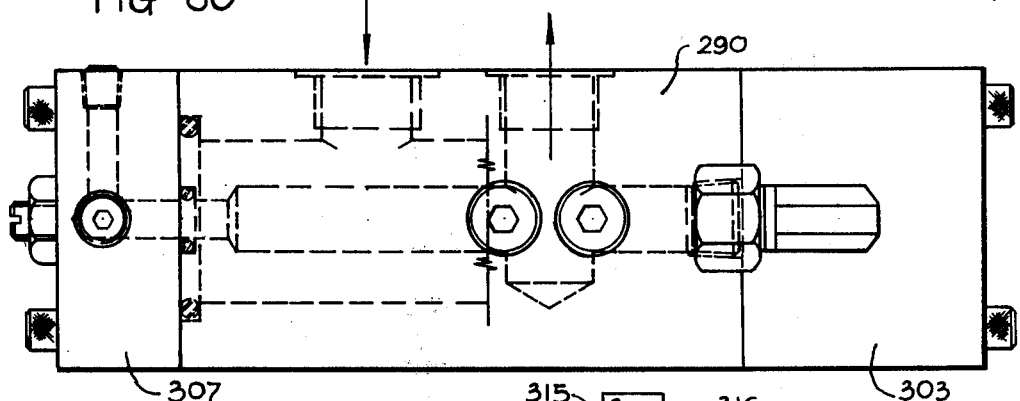
FIG 8A
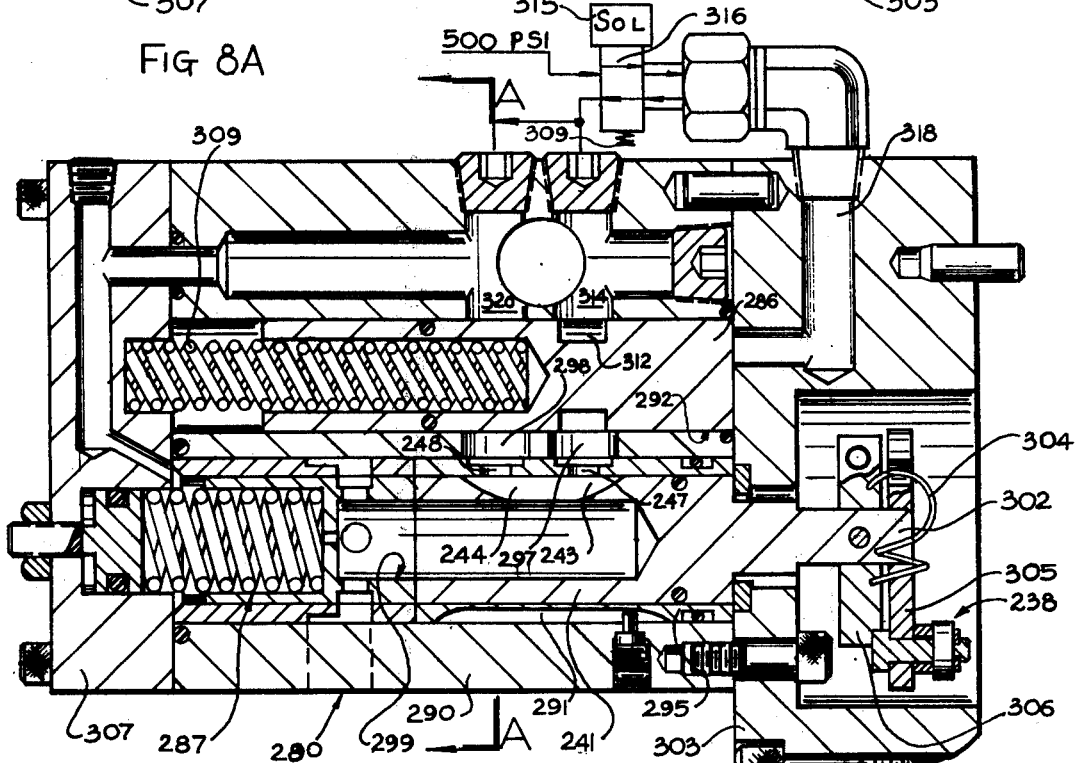
FIG 8
INVENTOR
EARL R. LOHNEIS
JOHN J. SCHACHTE
ATTORNEY
William C. Gleisner Jr.

UNITARY WORK CHANGER FOR A MACHINING CENTER

This is a continuation of application Ser. No. 12,057, filed Feb. 17, 1970, now abandoned.

BACKGROUND OF THE INVENTION

The present invention can be classified generally with the group of prior devices identified as machining centers. As presently known, a machining center comprises a machine having the capability of bringing a plurality of different metal cutting tools to a workpiece in selected sequence for performing a sequence of different metal cutting operations upon that workpiece. The present machine belongs to a new and novel group of machines having a tool spindle or tool support adapted to support a rotatable metal cutting tool for rotational movement, or to support a non-rotatable cutting tool for rectilinear movement to perform a metal cutting operation. During rotational movement, the rotary cutting tool is moved relative to a workpiece carried for rectilinear movement to perform one type of metal cutting operation, either milling or drilling. During nonrotational, rectilinear movement, a nonrotatable cutting tool is carried by the same tool spindle for cutting movement relative to the same workpiece now carried for relative rotational movement to perform a different type of metal cutting operation. In other words, the spindle is selectively rotated for moving a cutting tool relative to a rectilinearly movable work support; and, the tool spindle is rectilinearly moved relative to the same workpiece carried for relative rotational movement to perform a lathe type metal cutting operation.

BRIEF SUMMARY OF THE INVENTION

The present invention comprises a work spindle selectively adapted to support a workpiece for rotation, or for rectilinear movement. To accomplish this, the work spindle is adapted to releasably and fixedly engage a work securing ring. As the work spindle is powder driven for rotating a workpiece or moving a workpiece along a rectilinear path relative to a cutting tool carried by a cooperatively movable tool spindle, a next workpiece to be machined is loaded into a spaced apart storage support member. The next work support is secured within a like storage ring which is releasably clamped within the storage support member. A mechanical workpiece changer is operative to remove the fixture ring with the workpiece secured thereon at the change position as a unit from the storage member, and transfer the complete fixture ring and workpiece as a unit to the workpiece spindle. At the same time, the workpiece changer is operative to remove and transfer a fixture ring with a workpiece secured thereto which has had a machining operation performed thereon from the work spindle and transfer that complete unit to the support member for subsequent removal from the machine. During transfer movement, the workpiece changer is adapted to retain the workpiece fixture rings in angularly clamped positions. The next workpiece transferred into the work spindle will have a machining operation or series of machining operations performed on it, and during the machining operation, the previously finished workpiece may be removed from the associated fixture ring and a new workpiece secured to that support ring. To perform the required machining operations on a workpiece supported by the work spindle, the tool spindle is adapted to receive either rotary cutting tool or a stationary single-point tool from an adjacently positioned tool storage magazine. To accomplish this, the tool spindle is adapted to releasably receive and fixedly retain either a nonrotatable tool, such as a lathe tool, or a rotatable tool such as a milling cutter or drill.

The tool storage magazine is adapted to receive a plurality of metal cutting tools including nonrotatable tools and tools adapted to be selectively rotated for performing metal cutting operations. A tool transfer or interchange member is mounted for selective power driven movement to effect an interchange of tools between the tool spindle and the tool storage magazine. Either single-point tools or rotatable tools can be selectively interchanged between the tool storage magazine and the tool spindle which is adapted to receive and operate either a nonrotatable tool or a rotatable tool.

A principal object of the invention is to provide an improved velocity control for an interchange mechanism of a machine tool.

Another object of the invention is to provide an improved automatic latching mechanism operative to releasably clamp a member to be transferred to a selectively movable machine tool transfer arm.

Another object is to provide a power operated tool transfer arm having an improved velocity control in combination with improved latching means adapted to releasably clamp a member to the arm during transfer movement thereof.

Another object is to provide a simplified velocity control for a power operable transfer arm that automatically accelerates the rate of movement at the start of a transfer cycle and automatically decelerates the rate of movement toward the completion of the same transfer cycle.

Another object is to provide an improved interchange mechanism for a machine tool having improved means for automatically clamping a member into the interchange mechanism in combination with a cooperating velocity control for increasing the speed of transfer movement during an interchange cycle.

Another object is to provide an improved velocity control for greatly accelerating operation of an interchange transfer mechanism.

Another object is to provide an improved interchange mechanism for accelerating transfer movement of extremely heavy workpieces.

BRIEF DESCRIPTION OF THE DRAWINGS

The obvious features and advantages of the present invention will become more apparent from the following detailed description of preferred embodiment shown in the accompanying drawings, in which:

FIG. 1 is a view in side elevation of a machining center incorporating the present invention and having a tool changer disposed to operate in coordinated relationship with a work changer;

FIG. 2 is a view partly in vertical section and partly in elevation of the machine shown in FIG. 1, as viewed from the rightward end;

FIG. 3 is an enlarged, detailed view in vertical section through the work change arm and drive therefor;

FIG. 4 is an enlarged view of the work change arm for effecting an interchange of workpieces between the storage position and the operating position;

FIG. 4A is a fragmentary view showing the pivot link engaged and actuating the linkage mechanism 123;

FIG. 4B is an enlarged fragmentary view showing the chuck 186 disengaged;

FIGS. 4C to 4F inclusive are enlarged fragmentary views of a modified form of tool change arm 112X;

FIG. 4G is a chart showing the velocity control of workpiece arm rotation;

FIGS. 6A to 6H inclusive illustrate the angular position of the velocity control cam in coordinated relationship with effecting positioning of the valve aperture for controlling the velocity of workpieces during an automatic interchange between operating and stored positions;

FIG. 7 is a schematic, diagrammatic block diagram of the hydraulic drive circuit for actuating the velocity control cam to effect a selective interchange of workpieces;

FIG. 8 is a view in transverse vertical section through a velocity control valve having one portion responsive to the control cam and another portion coordinately responsive to the hydraulic control circuit;

FIG. 8A is a top plan view of the valve shown in FIG. 8;

FIG. 8B is a view in transverse section through the valve shown in FIG. 8 and shown along the plane A—A therein;

FIG. 8C is an enlarged, fragmentary view of the velocity control valve spool in FIG. 8;

DESCRIPTION OF THE PREFERRED EMBODIMENTS

Figure 5A:
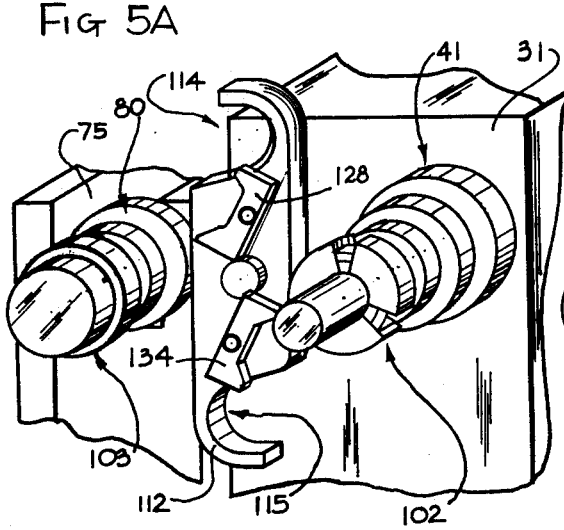
FIGS. 5A to 5F inclusive illustrate the general sequence of movements of the work change arm during a cycle of movements in effecting an interchange of workpieces between the storage position and the operation position.
Figure 5B:
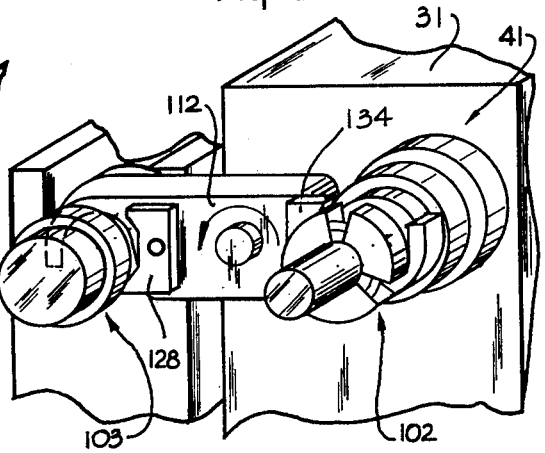

Referring now to the drawings and specifically to FIGS. 1 and 2 thereof, a machining center incorporating the features of the present invention is there shown in side elevation. As illustrated in FIG. 1, the machine comprises generally an elongated supporting bed 30 which slidably supports a work spindle headstock 31 at one end in operative relation to a relatively movable tool supporting cross slide 35 at the other end thereof. To this end, the top surface of the bed 30 is provided with horizontal ways 32 which are engaged by complementary ways 33 formed on the underside of the headstock 31.

Movement of the work spindle headstock 31 in either direction is effected by rotating a screw 34 which is in threaded engagement with a recirculating ball bearing nut 36 that is fixed to the under surface of the headstock 31. The screw 34 is rotatably supported in suitable bearing structures (not shown) provided in the bed 30. A motor 37 carried within the interior of the hollow bed 30 is connected to rotate the screw 34 in either direction for selectively actuating the headstock 31 in its path of travel by power.

Positioning control for effecting the desired positioning movement of the headstock 31 to present a workpiece carried thereby at a selected desired position relative to a cutting tool is accomplished by operation of a cooperating scale 38 and sensing head 39. The exemplary embodiment shown in FIG. 1 comprises essentially the linear scale 38 which is mounted on the side of the headstock 31 for movement therewith and relative to the cooperating sensing head 39 which is fixedly secured to the side face of the bed 30. Cooperative coaction between the sensing head 39 and scale 38 provides an accurate feedback signal to indicate the position of the headstock 31 along the bed 30, and both the scale and sensing head are well-known commercially available units.

The headstock 31 rotatably supports a horizontally disposed workpiece spindle 41 constituting the machine work station that is adapted to receive a workpiece W for rotation therewith. The spindle 41 is rotatably driven at a selected one of a plurality of speeds obtained from a selectively shiftable transmission 42 carried within the headstock and diagrammatically shown in FIG. 7. The output of the transmission 42 is transmitted to the spindle via a gear cluster 43 which is selectively shiftable into meshing engagement with one or another pair of spindle drive gears 44 and 46 that are secured directly to the spindle 41. As diagrammatically illustrated in FIG. 7, power to drive the transmission 42 is obtained from an electric motor 47, and it is also supported within the headstock 31. Power from the motor 47 is transmitted to the transmission 42 and thence through a directional drive clutch mechanism (not shown) that is contained therein. It will be apparent that the motor 47 is energizeable to drive the transmission at a selected speed for, in turn, driving the workpiece spindle 41 at a selected speed in a clockwise or counterclockwise direction of rotation.

With power drive to the headstock spindle 41 discontinued, the workpiece spindle 41 is stopped in a predetermined angular position. To achieve this result, the normal power drive to the spindle from the motor 47 is discontinued and the spindle driven at a creep rate until it has been rotated into a predetermined angular position.

To accomplish this, a separate variable speed servo drive mechanism 49 is connectible to rotate the tool spindle 41 independently of the power driven transmission 42. It will be understood that the servo drive mechanism 49 is operable to rotate the workpiece spindle 41 into a predetermined angular position with respect to a tool receiving operator 56. Depending upon the selected mode of operation of the workpiece spindle 41, the tool operator or spindle 56 is adapted to receive a tool indicated generally at 55 in FIG. 1 that is operative to perform the appropriately required metal cutting machining operation. In other words, the tool spindle headstock 35 shown in FIG. 1 is provided with a tool spindle 56 that is selectively operative to releasably receive a nonrotatable tool 55A which is fixedly clamped against rotation in predetermined angular relationship to the spindle 56 for the performance of a lathe-type operation. Upon bodily removal of the single point tool 55A from the tool spindle 56, a rotatable tool such as a milling cutter or drill is operatively insertable therein and the tool spindle 56 power driven at a selected rate of rotation by means of a variable speed power driven transmission (not shown).

To support a selected tool 55 for movement relative to the cooperatively disposed workpiece spindle 41, the tool operator 35 is carried by a slide member 59 provided with inwardly extending way surfaces (not shown) that are maintained in continuous sliding engagement with spaced apart ways 60 presented by a selectively movable hollow guide structure 61. In a similar manner, the underside of the guide structure 61 is provided with laterally spaced apart guideways (not shown) which are maintained in slideable engagement with laterally spaced apart horizontal ways presented by the upper portions of the stationary bed 30. Only one of the longitudinally extending, horizontal ways 63 presented by the bed 30 is illustrated in FIG. 1. It will be readily apparent that the longitudinal way 63 cooperates with a similar corresponding rearwardly spaced apart way (not shown) presented by the bed 30 in a manner to support the guiding structure 61 for horizontal, longitudinal movement along a Z axis relative to a workpiece W carried by the work spindle 41. Separate and independent power drive means (not shown) are respectively connected to effect selective, reversible movement of the guiding structure 61 along the Z axis, as well as to effect movement of the slide member 59 along the angular ways 60 presented by the guide structure 61, and along the C axis parallel to those ways. It will be readily apparent that any cutting tool 55 carried by the tool operator 35 is thereby selectively movable along either the C axis or along the Z axis, depending upon the mode of operation of the cooperatively disposed work spindle 41.

For storing a plurality of metal cutting tools to be selectively used in the tool spindle 56, a tool storage magazine 66 is rotatably journalled for selective indexable rotation about a horizontal axis against the rearward face of a vertically outstanding support frame 67 carried by the bed 30. upon selective indexable movement of the tool storage magazine 66, a next required tool carried thereby is indexably advanced into a forwardly extending tool change position substantially parallel to the axis of a tool, such as the tool 55A, illustrated as then being carried by the tool spindle 56. Upon arrival of the required tool in forwardly extending position and in the tool change station spaced rearwardly from the spindle 56, a tool change arm 71 is selectively movable through a tool change cycle in a manner to effect an interchange of tools between the tool spindle 56 and a tool indexing socket presented by the tool storage magazine 66. The arrangement for effecting such a tool interchange between a tool storage magazine and tool spindle is illustrated and fully described in the prior filed U.S. patent application entitled, "Machine Tool" with the Ser. No. 641,435. In particular, attention is directed to the fact that the prior filed U.S. application incudes a complete description of an indexable tool storage magazine operatively disposed to indexably position a tool into a forwardly extending tool change station is predetermined, parallel spaced relationship to a tool carried by a tool spindle. Likewise, the prior described patent application provides a selectively movable tool change arm 71 operative to selectively and bodily transfer tools between the tool spingle 56 and the tool change station afforded by the indexable storage magazine 66. It should be noted that the prior mentioned patent application describes a tool storage magazine that is indexable about a vertical axis and is provided with a plurality of radially extending storage sockets individually indexable into an axially parallel position relative to the tool spindle there shown. Although the tool storage magazine of the prior application was indexable about a vertical axis, the mode of operation of that machine both with respect to the storage magazine, the associated dual purpose tool spindle, and the relatively movable tool change arm are substantially similar to the like identified members of the present patent application.

It will be apparent that the selected mode of operation of the workpiece spindle 41, FIG. 1, depends upon the required sequence of operations of a workpiece W carried thereby. A program of operations may include turning operations that require axial rotation of the workpiece spindle 41 relative to an associated single point tool 55A fixedly carried by the associated dual purpose tool operator 35. During such an operation, it will be apparent that the slide member 59 may be selectively moved along the C and Z axis in selectively coordinated relationship with movement of the work spindle 41 along an associated axis. In any workpiece such as W in FIG. 1, a plurality of different operations such as turning, milling, drilling, boring and tapping may be required in any predetermined sequence, depending upon the workpiece configuration. For brief illustrative purposes, assume that a milling operation is to be performed on the vertical front face 73 of the workpiece W. To do this, the tool storage magazine 66 is indexed to position such a milling cutter at the tool change station in a rearwardly spaced position relative to the tool spindle 56 of the tool operator 55. In the described example, subsequent operation of the tool change arm 71 effects a return movement of the turning tool 55A from the spindle 56 to the magazine 66 and a concomitant forward transfer movement of the rotatable face milling cutter to the spindle 56. With a face milling cutter then operatively carried by the tool spindle 56, the latter is rotatable under power as well as being rectilinearly movable by an associated power translator, to perform a face milling operation on the front vertical face 73 of the workpiece W.

During such an operation, and depending upon the requirements of the exact configuration of the workpiece faces 73, the work spindle 41 is selectively movable along a plurality of associated paths. After utilizing the tool spindle 56 to perform a preselected plurality of different machining operations on a selected workpiece, such as the workpiece W in FIG. 7, an interchange of workpieces is effected between the operating work spindle 41 and the work receiving storage station 51, as shown in FIG 7. As there shown, the axis of the work receiving storage station 51 is disposed in horizontal parallelism to the axis of the workpiece holding or headstock spindle 41. As also shown in FIG. 7, the tubular support frame 75 is provided with an axial bored opening 76 within which is carried a quill 78. A workpiece storage spindle 80 journalled within the quill 78 is normally constrained therein against rotation, and in predetermined angular relationship to a corresponding predetermined angular position of the operating workpiece spindle 41 within the spindle headstock 31.

Toward its inner or lower end as viewed in FIGS. 1 and 2, the pivotal workpiece storage frame 75 is provided with a pair of transverse bored openings 88 that engage the opposite ends of a shaft fixedly secured to and extending through the upper end of a bracket secured at its lower end to the bed 30 to the workpiece spindle 41. Only one of the bored bearing openings 88 in the pivotal frame 75 together with the stationary support shaft 89 are shown in FIG. 1.

For moving the frame 75 pivotally relative to the support shaft 89, a pair of piston rod support brackets are pivotally secured in axial alignment to the opposite side faces of the frame 75; this arrangement is illustrated in FIG. 1 in which the bracket 92 is journalled to a stub shaft 93 affixed at its inner end to the side face of frame 75. The bracket 92 is secured to the upper end of a piston rod 94 that extends downwardly within a yoke 95 and attached tubular piston 96 adapted to telescopingly receive the inner end of the piston rod 94. The inner face of the yoke 95 is pivotally secured to the vertical side face of a bracket 90 affixed to the frame along an axis aligned with 97 as indicated in FIG. 1. The upper end of the piston 96 is fixedly secured to the underside of the yoke 95 and cooperates therewith in tubular fashion to receive the piston 94 as hereinbefore explained.

As shown in FIG. 2, a yoke 95A is pivotally secured to the opposite side face of the bracket 90 and is likewise integrally secured to the upper end of a downwardly depending tubular piston 96A. The piston 96A and the yoke 95A also cooperate in tubular fashion to receive the downwardly depending portion of a piston rod (not shown) that is pivotally secured at its upper end to the inner vertical faces of the frame 75. The dotted line 98 in FIG. 2 indicates the position of a horizontal shaft that extends transversely through the vertically upstanding bracket 90. The respective outer ends of such a shaft, positioned along the dotted line 98 as described, pivotally support the axially spaced apart yokes 95 and 95A together with the downwardly depending tubular pistons respectively secured thereto. Actuation of the respective, spaced apart fluid actuators 96 and 96A, FIGS. 1 and 2, moves the frame 75 from the vertical manual work loading position there shown into horizontal parallel alignment with the tool spindle 41 in FIG. 7; in other words, the frame 75 and workpiece carried thereby are moved into the work receiving storage station identified at 51. Subsequent to pivoting the frame 75 about the transverse shaft 89, a workpiece WM carried thereby is in horizontally parallel alignment with the workpiece W in the spindle 41. In further preparation for a workpiece interchange, the translating screw 34 shown in FIG. 1 is selectively actuated to effect the necessary axial alignment of the workpiece W with the workpiece WM which is then in the workpiece storage station 51 in FIG. 7.

The workpieces W and WM are respectively secured to uniformly shaped circular fixture rings 102 and 103 by means of radially movable clamps 104 and 105 respectively mounted in annularly spaced relationship on the fixture rings. Each of the fixture rings 102 and 103 comprises a uniformly shaped base section particularly adapted to be retained in releasable clamping engagement with the respective work spindles 41 and 80 as shown in FIG. 7. Each fixture ring 102 and 103 is provided with releasable chuck mechanisms 108 and 109 on which the clamps 104 and 105 are movably mounted for selective radial movement into clamping engagement with the workpieces W and WM.

It will be apparent that this arrangement renders the fixture rings 102 and 103 selectively operable to releasably clamp selected ones of a wide range of different sizes and shapes of workpieces for selective and releasable transfer movement to the operating workpiece spindle 41 shown in FIGS. 1, 2 and 7. It will be further apparent that this arrangement permits unloading a completely machined workpiece from one fixture ring, after it is returned from the workpiece spindle 41 to the work receiving storage station 51 and thence pivoted to the vertical unloading station shown in FIG. 1. As this occurs, a different workpiece previously transferred to the workpiece spindle 41 is being machined. Likewise, a next workpiece to be machined is manually loaded into the vertically positioned spindle support 75 in FIG. 1. It will be understood that a next workpiece is actually secured within the radially movable chuck jaws of the chuck mechanism 108 secured to the fixture ring 103. With the latter releasably clamped to the spindle support, the spindle support 75 is again pivoted 90° in a forward direction as previously explained and into the work receiving station 51 illustrated in FIG. 7.

As shown in FIGS. 1, 2 and 3, a workpiece change arm 112 is in a vertical parked position between the horizontal workpiece spindle 41 and the vertically positioned spindle support 75. The change arm 112 is journalled to rotate on an upstanding portion of the main support frame 30A; it is selectively operative to effect a bodily interchange of workpieces between the workpiece spindle 41 and the workpiece storage spindle 80 whenever the latter is moved into the horizontal work receiving storage station 51 shown in FIG. 7.

To effect such an interchange, the arm 112 is provided with upper and lower semicircular openings 114 and 115 extending in opposite directions and respectively provided with associated grips operative to releasably engage a pair of workpieces. The upper semicircular opening is additionally referred to as grip 114 and comprises an annularly spaced pair of hardened actuating buttons 116 and a cooperatively disposed pivot clamp or link 128 pivotally carried by a pin 129 extending from the arm 112. The buttons 116A and 116B are mounted on one side of the work change arm 112, and the buttons 116C and 116D are mounted in like relationship on the opposite side of the arm. During a workpiece interchange, the two pairs of buttons 116A, B, and 116C, D engage spaced apart portions of the circular base portion of the fixture ring groove 120 in cooperation with the opposite outer faces of the buttons engaging the opposite edges of the same groove. During a workpiece interchange, likewise, a pair of annularly spaced apart angular faces 127A and 127B presented by the pivot clamp 128 are maintained in clamping engagement with other peripherally spaced apart portions of the groove 120.

As indicated in FIG. 4, the first angular flat portion 127A of the pivot clamp 128 initially and resiliently engages a circular portion of the fixture ring groove 120, in advance of the angular portion 127B and the fixed clamp buttons 116. The spaced apart flat portion 127B is simultaneously maintained in cooperating clamped engagement with a flat, angular portion 126 presented by the groove 120. Due to velocity control cam 198 through approximately the next 20° the continued forward pivotal movement of change arm 112 is gradually slowed to zero velocity during which time the other cooperating flat portion 127B is brought into abutting engagement with the flat surface 126 presented by the groove 120. During this 20° approach interval, a torsion spring 148 continuously maintains face 127A abutting the periphery of groove 120. Upon continued pivotal movement of the workpiece change arm 112 into its initial 90° clamped and engaged position, the rate of forward movement slows from maximum velocity at 45° to zero velocity at the 90° position. From approximately 20°, the portion 127A moves into abutting engagement with the circular portion of the groove 120.

During a bodily interchange, a rearwardly positioned latch plate 138 affixed to the pivot clamp 128 is engaged by outward clamping engagement with the cooperatively disposed angular portion of a wedge member 142, shown in FIGS. 3, 4 and 7. The wedge member 142 is mounted for movement in a guideway 144 formed in the change arm 112, for outward extensible movement along a path parallel to the axially movable actuating rod 153, and into wedging engagement with the rearward face of the latch plate 138. As indicated by the phantom line position of the pivot clamp 128, angular faces 127A, B are resiliently urged into rightward engagement with one spaced apart peripheral portion of groove 120 as the two pairs of actuating buttons 116A, B and 116C, D are moved into cooperatively spaced apart peripheral portions of the circular groove 120. It is emphasized that this condition does not occur until arrival of the clamp arm 112 in its initial 90° position, and in operative clamping engagement with the workpiece. Thereupon, a solenoid 156 is deenergized to deenergize a clamp actuator 130, FIG. 7 and permit retracting movement of rod 153. With the rod 153 likewise released, resiliently actuated extensible movement of the wedge actuating members 142 and 143 is effected by axially expansible springs 158 and 159 in the arm 112. To maintain the actuating wedges 142 and 143 in retracted inward position, as illustrated in FIG. 4, it is necessary to energize the solenoid 56 of a valve 157 thereby urging a valve spool 154 outwardly to pressure actuated position in opposition to the biasing spring 155. With this condition existing, pressure fluid is transmitted from a low pressure supply line 162 via a line 163 in the outwardly moved valve spool, and thence via a line 164 to urge a piston 165 of the fluid actuator 130 outwardly.

Outward movement of the actuator piston 165, in turn, effects axial outward movement of the rod 153 together with the outer flanged member 166 that engages the inner ends of pivotal toggle arms 167 and 168. It will be apparent that whenever the flanged member 166 is moved axially outward in response to energization of solenoid 156, as described, the opposite inner ends of the toggle arms 167, 168 are both pivoted inwardly to retract both wedges 142, 143 axially inward. Thus, both wedges 142 and 143 are then fully retracted to fully compress the respective actuating springs 158 and 159, whenever the solenoid 156 is energized to effect outward movement of the fluid actuator 130 and the associated actuating rod 153.

Conversely, as previously explained, the solenoid 156 is deenergized after both angular faces 133A, B are moved into full engagement with the base 121 of the groove 121 to effect resiliently biased latching of the wedges 142 and 143 by the respective actuating springs 158 and 159.

In brief summary, the timing sequence to effect a workpiece interchange between the work spindle 41 and the storage spindle 80 in the storage station 51 is as follows. Initially, the change arm 112 is rotated 90° in a clockwise direction to simultaneously engage both workpieces WM and W as described. After the workpieces are both in angularly clamped positions within tool grips 114 and 115 of the arm in 90° position, unclamp solenoids 172 and 173 are both energized to move the respectively associated valve spools 174 and 175 to forward pressure actuated positions. Next, actuating rod 178 and 179 which are normally urged forward by springs 182 and 183 are both retracted axially in response to energization of the unclamp solenoids 172 and 173. Axial retraction of the rods 178 and 179, in turn, is disposed to effect pivotal retraction of the chuck jaws associated with the respective power actuated chuck mechanisms 186 and 187.

After this takes place, a next solenoid 189 is energized to effect movement of an associated valve spool 190 to its upper position as shown in FIG. 7. Pressure fluid is then transmitted via pressure lines 192 and 193 to release the clamping pressure applied to pressure actuators 194 and 195. Inasmuch as the power actuated chucks 186 and 187 are then fully released, the described activation of both power actuators 194 and 195 effects bodily axial retraction of both spindles 41 and 80 from engagement with the fixture rings 103 and 102. Prior to this, both the fixture rings 103 and 102 together with the associated workpieces WM and W are then releasably clamped to the workpiece change arm 112 positioned in its initial 90° position.

As shown in somewhat greater detail in FIGS. 4B and 7, each of the power actuated chucks comprise a plurality of pivotal jaws pivotally secured to the outer ends of the respective work spindles 51 and 41. As shown in FIG. 4B, for example, jaws 184 and 184A are pivoted angularly outward relative to the storage spindle 51. The respective clamp jaws 184 and 184A are pivotally secured within radial slots formed in a mounting collar 181 fixedly secured directly to the outer end of the storage spindle 51. An annular locking plate 185 is resiliently secured to the outer end of the actuating rod 178 by a spring 185A maintained in position by a cap screw 185B engaging the outer end of the actuating rod 178.

As will hereinafter be more fully described, a velocity control cam 198 effects directionally controlled operation of a power drive 199 to rotate a tubular drive shaft 201 to continue rotation of the change arm 112 an additional 180° in a clockwise direction. After the change arm has rotated 180° further in a clockwise direction, the respective workpiece grips 114 and 115 are now in pivotally interchanged position with the retracted spindles 41 and 80 respectively. In other words, the workpiece WM carried within the grip 114 is now axially aligned with the work spindle 41 and the workpiece W carried within the grip 115 is now aligned with the storage spindle 80. After the initial interchanged alignment has been achieved, as described, the solenoid 189 is deenergized and the associated valve spool resiliently biased to its opposite or return position. With the valve spool 190 urged to its opposite position by the spring 204, pressure fluid is transmitted via a drilled line 205 therein to a transmission line 208. With the line 192 connected to exhaust and the line 208 connected to again actuate the fluid actuators 194 and 195 in a forward direction, the fluid actuators are again operated to effect axial forward movement of the spindles 80 and 41. The spindles 41 and 80 are moved forward into the now interchanged fixture rings 103 and 102 together with the associated workpieces WM and W carried thereby.

Completion of the described workpiece interchange is effected upon deenergization of the clamp solenoids 172 and 173, as soon as power actuators 194 and 195 effect axial relative return between the spindles and the now interchanged fixture rings. Deenergization of solenoid 172 effects resilient return of the valve spool 174 by the spring 210. Upon resilient return of the valve spool 174 to the position shown in FIG. 7, a fluid pressure line 211 is connected via a line 212 in the upwardly moved valve spool to a supply line 213 connected to effect axial forward movement of the actuating rod 178 by actuating spring 182. At the same time, deenergization of solenoid 173 permits resilient return of the value spool 175 by the spring 215 to the position illustrated in FIG. 7. During this condition, solenoid 176 is retained in energized condition to retain the value spool 177 positioned to transmit fluid pressure to the branch supply lines 180 and 380. With this condition existing, deenergization of the solenoid 173 permits the spring 215 to effect upward movement of the valve spool 175 and connection of the pressure line 180 via the transverse valve spool line 216 to the output line 217.

It is reiterated that engagement of the respective semicircular openings 114 and 115 formed in the arm 112 does not actually occur until the arm has rotated 90° in a clockwise direction from its vertical parked position. As such a 90° rotation of the arm 112 occurs, the linkage mechanism 123 functions to resiliently bias the links 128 and 134 about the respective pivot pins 129 and 135 which are carried for bodily movement by the arm 112. As shown in FIG. 4, the respective pivot links 128 and 134 are operatively interconnected to a central actuating link 145 that is pivotally secured to a rotatably journalled pin 146. As shown in FIG. 3, an inner or rearward portion of the centrally journalled actuating link 145 is interconnected by means of a torsion spring 148 to the inner face of the tool change arm 112. Referring again to FIG. 4, it will be noted that an actuating rod 150 is pivotally interconnected between one end of the centrally disposed actuating link 145 and the upper end of the pivotal latching link 128. In like manner, another actuating rod 151 is pivotally interconnected at its opposite ends to one end of the central actuating link 145 and the lower pivotal link 134. The arrangement is such that power driven clockwise movement of the workpiece change arm 112 effects 90° movement of the respective openings 114 and 115 into engagement with the grooves 120 and 121 presented by the fixture rings 103 and 102, thereby moving the button 116 and 117 into engagement with the grooves.

As the arm 112 rotates into such engagement, the angular faces 127A of link 128 and angular face 133B of link 134 resiliently engage the respective fixture ring grooves 120 and 121 first. The torsion spring 148 resiliently urges the linkage mechanism 123 to rotate in a clockwise direction until the links 128 and 129 fully engage the respective grooves 120 and 123 in opposition to the sets of buttons 116 and 117 engaging spaced apart portions of the same grooves. As soon as this 90° position is achieved, the angular flats 127B and 133B presented by the links 128 and 134 are respectfully biased into engagement with the flat surfaces 126 and 132 formed on the associated grooves 103 and 102.

By means of this arrangement, the individual workpieces and their respectively associated fixture support rings 102 and 103 are always retained in predetermined positions in the machine. This applies both to the axial and angular position of the workpiece in the storage spindle 80 and the relative corresponding positions of the workpiece in the workpiece spindle 41. Prior to effecting an interchange of workpieces, therefore, the workpiece spindle 41 is moved into a predetermined axial and angular position relative to the storage spindle 80. After the spindles 41 and 80 have been moved into predetermined corresponding positions, a work change arm 112 is selectively operative to effect a bodily interchange of workpieces between the respective spindles 41 and 80.

In addition to effecting the interchange, the movable change arm 112 is provided with a coordinately operative linkage mechanism adapted to cooperate with the fixture rings 102 and 103 to retain them in like relative positions during the interchange. Furthermore, both of the work spindles 41 and 80, as well as the fixture rings 102 and 103 are equipped with cooperatively disposed annular clutch teeth that are engaged after the interchange is completed to retain the fixture rings in the same relative angular alignment.

In FIGS. 4C to 4B inclusive, there is illustrated a workpiece change arm 112X of slightly modified form. Although operative to perform the same work changing function as the change arm 112 illustrated in FIG. 4, the change arm 112X is provided with oppositely oriented semicircular tool grip openings 114X and 115X adapted to directly engage circular timing grooves in the tools. As shown in FIG. 4C, for example, the oppositely oriented semicircular openings 114X and 115X are respectively presented by the change arm 112X in positions to be moved into direct engagement with the circular grooves 120 and 121 in the tool fixture support rings 103 and 102. As the semicircular change arm openings 114X and 115X are moved into direct controlling engagement with the circular grooves in the support rings 103 and 102, the respective rotatable control links 128 and 134 are cooperatively moved into pivotal engagement with spaced apart portions of the respective fixture rings 103 and 102. In other words, both of the links 128 and 134 are pivoted into full clamping engagement with the fixture rings 103 and 102 after which the links 128 and 134 are releasably secured to the tool change arm 112X in pivotally clamped positions.

The linkage mechanism 123X is provided with spaced apart actuating springs 252 and 253 in lieu of the single, centrally located torsional actuating spring 148 shown and described in FIG. 3. With the change arm 112 in vertical retracted position, the spaced apart springs 252 and 253 are adapted to resiliently maintain the pivotal links 128 and 134, as well as the entire linkage mechanism 123X in retracted position to cooperate with the change arm 112 to facilitate a workpiece interchange between the spindles 41 and 80. As hereinbefore described, the workpiece change arm 112X is in a vertically upstanding position at the start of a workpiece interchange cycle. From the vertical position, the change arm 112X is rotated in a counterclockwise direction (as viewed from the front) in FIGS. 4C, 4D and 4E. Upon arrival of the change arm in the position shown in FIG. 4C, the angular face 127A of the pivotal link 128 moves into abutting engagement with the circular periphery of the fixture ring 103. The spring 252 is connected at one end to a fixed pin 256 secured to the arm 112X and at its opposite end to a fixed pin 257 secured to the face of the pivot link 128 to effect pivotal movement of the latter counterclockwise relative to its pivotal support pin 129.

As the change arm 112X continues to rotate in a counterclockwise direction at a gradually reducing speed rate, the angular face 127A of the pivot link 128 is resiliently maintained in abutting and controlled engagement with the fixture ring 103. Due to the resiliently urged abutting engagement between the angular face 127A and the ring 103, the pivot link 128 is urged to rotate in a counterclockwise direction about the pivot pin 129 as the change arm 112X continues to be rotated in a counterclockwise direction. Upon further counterclockwise rotation of the pivot link 128 the opposite angular face 127B thereof is gradually rotated into abutting engagement with the angular position face 126 presented by the fixture ring 103, as shown in FIGS. 4D and 4E. After this occurs, the groove of the fixture ring 103 is maintained in fully clamped engagement between the semicircular tool grip opening 114X and the actuated clamp jaws 127B. Once the clamp is fully closed, as shown in FIG. 4B, the angular face 127B is maintained in clamping engagement with the angular face 126 of the fixture ring 103 to prevent rotation of the fixture ring during rotational movement of the work change arm 112 to effect a workpiece interchange.

Simultaneously with movement of the grip 114X into the described position in FIG. 4E, the opposite grip 115X and pivot link 134 are moved into coordinate positioning engagement with the fixture ring 102. Next, as hereinbefore explained, both of the extensible wedges 142 and 143 are moved axially outward into latching engagement with the respective latch plates 138 and 139 secured to the rearward faces of the pivotal links 128 and 134. This arrangement has been described in connection with FIG. 7 in which the springs 158 and 159 are illustrated as positioned to urge the wedges 142 and 143 into latched positions.

Likewise, as shown in enlarged fragmentary form in FIG. 4F, the extensible wedges 142 and 143 are shown in laterally displaced offset positions relative to the central actuating rod 153. For retracting the tapered wedges, a vertically upward force is applied to the lower end of the rod 153 to pivot the outer ends of toggle arms 167 and 168 downward to retract the wedges 142 and 143. Conversely, after the change arm 112 is moved to the clamped position shown in FIG. 4E, the retracting force is removed from rod 153. After this, the springs 158 and 159 exert a vertical latching force on the extensible wedges 142 and 143. Thus, the wedges 142 and 143 are continuously maintained in resiliently biased latching engagement with the respective latch plates 138 and 139 secured to the pivotally engaged links 128 and 134. The respective fixture rings 102 and 103 are maintained in fixedly clamped engagement within the semicircular outer ends 114X and 115X of the workpiece fixture arm 112. After being so secured, both fixture rings 103 and 102 are positively secured in locked positions and are likewise constrained against rotation. Prevention from rotation is effected by the locked engagement between the angular pivot link faces 127B, 133B and the angular flat surfaces 126 and 132 on the respective fixture rings. Holding the rings 103 and 102 in predetermined angular positions during an interchange is necessary for positioning a fixture ring and workpiece carried thereby in predetermined angular position in the spindle 41. To achieve desired angularity therefore, the workpiece in the storage spindle 80 is positioned at the desired angle and the workpiece in the spindle 41 is positioned at the desired angle.

Angularly tapered inner faces on the latch plates 138 and 139 are engaged by complementary angularly tapered faces on the axially outward extended wedges 142 and 143. Due to the tapered faces, the springs 158 and 159 exert sufficient outward pressure to positively maintain the wedges 142 and 143 in latched engagement with the plates 138 and 139 during rotational movement of the change arm 112.

The sequence of movements during an interchange are graphically illustrated in FIGS. 5A to 5F inclusive. As there shown in FIG. 5A, the work change arm 112 is in vertical position between the fixture rings 102 and 103 respectively carried by the workpiece spindle 41 and the storage spindle 80. From its vertical position shown in FIG. 5A, the workpiece change arm is rotated in a clockwise direction to the position illustrated in FIG. 5B to position the semicircular grips 114 and 115 into engagement with fixture ring grooves 102 and 103. During the first 90° of movement, the power drive for the change arm 112 increases from zero velocity to maximum speed at approximately the 45° position; velocity then again decreases with zero speed being reached at the 90° position.

After the fixture rings 102 and 103 are securely clamped in the tool grips by resilient closure of the wedges 142 and 143 with the plates, both spindles are unclamped. As shown in FIG. 5C, both spindles 41 and 80 are moved to axially retracted position thereby disengaging them from driving positions. Both the storage spindle 80 and the workpiece drive spindle 41 are provided with forward driving ends comprising annular teeth 224 and 225 respectively. Prior to retraction, the forward driving ends 224 and 225 of ths spindles 80 and 41 are maintained in intermeshing driving engagement with driven portions of the respective workpiece fixture rings 103 and 102 and comprising intermeshing annular gear teeth. This relationship is more clearly indicated in FIG. 7 in which the annular driving teeth 225 of the workpiece spindle 41 are seated in driving engagement with complementary annular driven teeth 227 on the fixture ring 102. In a similar manner, as shown in FIG. 7, the annular teeth 224 on the forward end of the storage spindle 80 are seated in driving engagement with complementary annular teeth 226 on the fixtures ring 103.

Figure 5C:
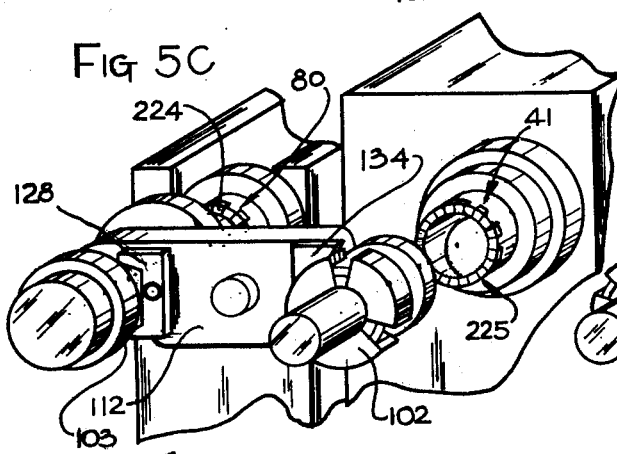
Figure 5D:
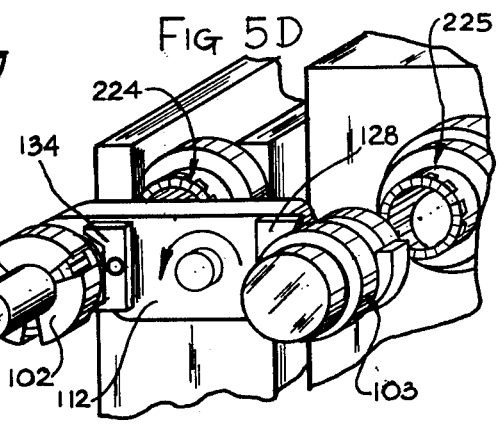

After the spindles 80 and 41 have been retracted to the positions shown in FIG. 5C, the workpiece change arm 112 is rotated an additional 180° in a clockwise direction to the position shown in FIG. 5D. During this 180° rotation, the power drive for the arm 112 increases speed from zero to maximum in the first 45°; sustains the maximum speed during the next 90°; and, again gradually reduces speed from maximum to zero during the last 45°. Throughout this 180° interchange, the fixture rings 102 and 103 are fixedly clamped in the opposite ends of the change arm 112 as described. Upon arrival in the 180° interchanged position in FIG. 5D, the annular driven teeth (not shown) of the fixture rings 103 and 102 are angularly positioned to engage the complementary angular spindle teeth 225 and 224. Because of this, angular alignment of the cooperating teeth merely actuate the power drives for effecting axial forward movement of the workpiece spindles 41 and 80 into driving engagement with the respectively interchanged fixture rings 103 and 102.

Figure 5E:
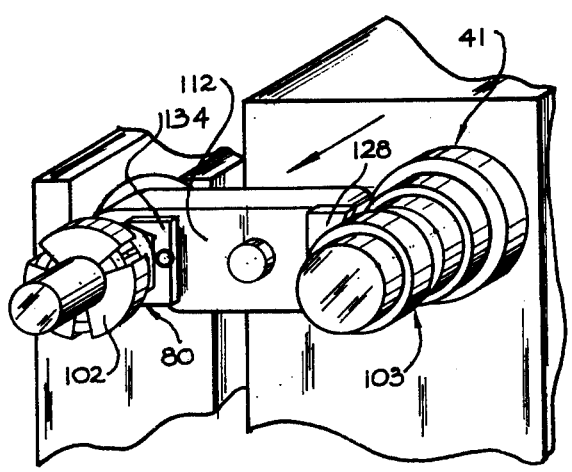
Figure 5F:
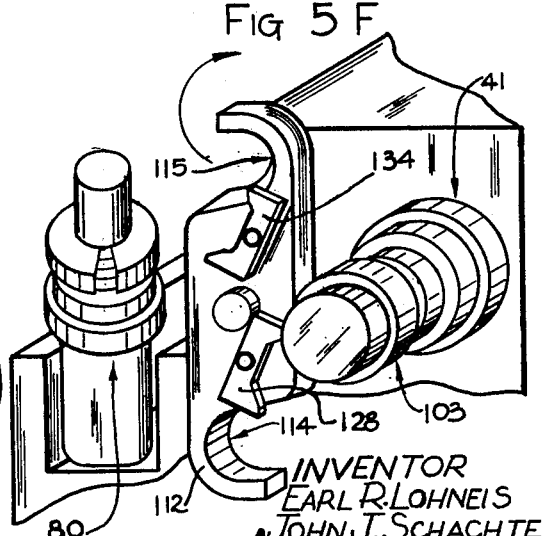

After the spindles 41 and 80 have been reengaged with the now interchanged fixture rings 103 and 102, as shown in FIG. 5E, the spindle chucks 186 and 187 are both reengaged. The central actuating rod 153 is then operated to effect power operated retraction of the wedges 142 and 143 within the workpiece change arm 112. Power actuated retraction of the wedges 142 and 143 from engagement with the latch plates 138 and 139 releases the pivotal links 128 and 134 for subsequent resilient return to home position. The sequence of operations has now proceeded to a point at which the properly angularly oriented interchanged fixture rings 103 and 102 are respectively and positively clamped to the workpiece spindles 41 and 80. Further, with the pivotal links 128 and 134 released, the power drive pivotally rotates the workpiece change arm 90° in a counterclockwise direction to vertical parked position as viewed in FIG. 5F. As explained with reference to FIG. 3, the torsion spring 148 operates to return both pivotal links 128 and 134 to home position as the latter are moved out of engagement with the interchanged fixture rings 103 and 102. Both links 134 and 128 are in the resiliently returned starting position as the workpiece change arm 112 is power driven 90° in a counterclockwise direction to the vertical parked position shown in FIG. 5F. Likewise at the completion of a workpiece interchange, the tubular support frame 75 is power driven to its vertical position as shown in FIG. 5F for facilitating a manual change of workpieces.

After one workpiece interchange has been effected as described in FIGS. 5A to 5F inclusive, the workpiece change arm 112 has advanced a total of 180° from the first to the last view in this series. The next cycle of movements for a second workpiece interchange is performed in like manner with movement of the work change arm 112 starting from the vertical position shown in FIG. 5F. The cam 198 for controlling movement and velocity of the change arm 112 functions in a manner identical to that hereinbefore described for FIGS. 5A to 5F inclusive.

As mentioned in connection with FIG. 7, each workpiece interchange cycle comprises three distinct individual segments of rotational movement of the workpiece change arm 112. These include a 90° clockwise segment into workpiece engagement, a 180° clockwise segment for interchanging workpiece position between the spindles, and a 90° counterclockwise segment to return parked position. Each segment of movement comprises an accelerating portion during which speed is increased from zero to a predetermined maximum velocity at approximately 45° of movement; and a decelerating portion during the last 45° of each segment of movement in which speed is decreased from the predetermined maximum to zero velocity. During the second or interchange segment of movement, velocity remains at the maximum for 90°, or from 135° to 225° with the decelerating portion of this cycle extending from 225° to 270°. The three segments of rotational movement of the work change arm 112 are selectively interspersed in predetermined sequence between other required movements of the workpiece spindles 80, 40 and the power drives therefore that are necessary to effect an interchange of workpieces.

These rotational velocity relationships of the workpiece change arm 112 are clearly and graphically illustrated in FIG. 4G in which the initial or starting 90° clockwise approach segment of movement comprises the 45° accelerating portion 230 and the 45° decelerating portion 231. Next, the workpiece interchange is effected in the next 180° of movement comprising a 45° accelerating clockwise segment of movement 233; maximum velocity being maintained for 90° during continued clockwise movement as indicated at 234; and with a decelerating clockwise portion of movement occuring during the last 45° as indicated at the solid line portion 235. After the interchange is completed, as indicated at the 270° position in 4G, the workpiece change arm from 112 is returned to a vertical parked position in a counterclockwise direction. The last portion of movement comprises a 45° counterclockwise accelerating segment indicated at the dotted line portion 238 and a 45° decelerating portion indicated at the dotted line portion 239 in FIG. 4G. Movement is stopped in the 180° vertical parked position corresponding to the completed sample cycle illustrated in FIG. 5F.

At the completion of the first interchange of workpieces between the storage spindle 80 and the workpiece spindle 41, as described, it will be apparent that the velocity control cam 198 is actually displaced angularly 180° from its starting position. Inasmuch as the velocity cam 198 is symmetrical in configuration, this has no effect on the next interchange of workpieces between the storage spindle 80 and 41, and rotational velocity is again controlled as indicated in FIG. 4G.

In order to control the accelerating and decelerating velocity portion of each segment of movement, the control cam 198 is rotatably driven by the tubular change arm drive shaft 201 that is connected to be driven by the reversibly and rate controlled power drive 199 for effecting rotatable movement of the workpiece change arm 112. The power drive 199 comprises a reversible fluid drive motor 260 and geared transmission 261 operatively interconnected to rotatably drive the tubular shaft 201 which, in turn, is connected to rotate the workpiece change arm 112 and velocity control cam 198. The drive transmission 261 includes an output shaft 262 driven directly by the motor 260 and gear 263. The latter is interconnected to drive a gear 264, shaft 265, and gear 266 connected to rotate gear 267. The latter gear is likewise connected to drive a shaft that rotates a gear 268 intermeshing with a gear 270 secured directly to the tubular drive shaft 201 for rotating the workpiece change arm 112. During rotation, the control cam 198 is operable to radially actuate a cam roller 238 schematically illustrated in FIG. 7 as actuating a control arm 239 connected to selectively adjust a fluid control valve 241. Biasing means (not shown) are connected in well-known manner to continuously urge the arm 239 and roller 238 carried thereby into operative engagement with the periphery of the rotatable velocity control cam 198. Actually, the control valve 241 comprises two separate valves 243 and 244, the positions of both of which are connected to be adjusted by the single control arm 239 that is connected to be moved axially upon rotational movement of the cam 198 as schematically shown in FIG. 7.

Because of the rate and motion control effected by the entire workpiece interchange system, the sequence of movements is briefly repeated in connection with FIGS. 5A to 5F inclusive. Initially, the workpiece interchange arm 112 is in vertical parked position as shown in FIG. 5A relative to the axially aligned storage spindle 80 and operating workpiece spindle 41. To greatly accelerate the speed of an interchange of workpieces between the storage spindle 80 and the operating spindle 41, a velocity control is operatively interconnected in the transfer control system as will be more fully explained. The velocity control automatically controls the acceleration and deceleration of movement of the transfer arm according to a predetermined cyclical pattern to both accelerate transfer movement and permit transfer of much heavier workpieces. To further facilitate transfer movement, the automatic clamping mechanism 123 is coordinately operative to releasably control clamping of the workpieces to the transfer arm 112 during transfer movement.

In addition to effecting movement of the spindles 80 and 41 into predetermined axial alignment, the control system is operative to effect movement of the workpiece spindle 41 into a predetermined angular position relative to the storage spindle 80. Angular positioning of the workpiece spindle 41 is required to effect predetermined angular alignment of the annular driving teeth 225 presented by the spindle 41 into predetermined angular alignment with the annular drive teeth 224 presented by the storage spindle 80. With the annular workpiece spindle teeth 225 in predetermined angular position relative to the storage spindle teeth 224, as viewed in FIGS. 5C and 5B, it will be apparent that the annular teeth 227 and 226 respectively presented by the fixture rings 102 and 103 are moved into corresponding angular positions. Furthermore, the linkage mechanism 123 is disposed to cooperate with the workpiece change arm 112 in a manner to clamp the fixture rings 103 and 102 in predetermined angular alignment with the semicircular tool grip openings 114 and 115 as hereinabove described with reference to FIG. 4.

With the spindles 41 and 80 being moved into predetermined axial and angular positions relative to one another as shown in FIG. 5A, it is reiterated that the work change arm 112 is then moved 90° from its vertical position in a clockwise direction as viewed from the front into fixed clamping engagement with the fixture rings 103 and 102. With the fixture rings 102 and 103 now clamped in like angular positions in the work change arm 112 as viewed in FIG. 5B, both spindles 41 and 80 are axially retracted to the positions illustrated in FIG. 5C. With this condition established, i.e. the fixture rings completely disengaged from the spindles, the work change arm 112 is then rotated 180° in a clockwise direction as viewed from the front (counterclockwise direction as viewed from rear) to the position illustrated in FIG. 5D. Upon arrival in this position, the annular teeth 227 and 226 respectively presented by the interchanged fixture rings 102 and 103 are aligned for reengagement with the annular teeth 224 and 225 respectively presented by the spindles 80 and 41. With relative axial movement again being effected between the spindles and the work change arm 112, the annular teeth presented by the fixture rings are moved into driving reengagement with the annular teeth presented by the respective spindles. The reengaged and interchanged fixture rings are then positively reclamped to the respective spindles 80 and 41 by operation of the power actuated chucks 186 and 187. After the chucks have been reactuated to clamp the interchanged fixture rings to the spindles, the work change arm 112 is rotated 90° in a counterclockwise direction as viewed from the front in FIG. 5F. With the workpiece interchange now completed, the work change spindle 80 is pivotally moved 90° rearwardly to the vertical parked position illustrated in FIG. 5F. Movement of the storage spindle with the next workpiece and supporting fixture ring for effecting the next workpiece operation.

The velocity control cam 198 operates to control the rotational movement of the work change arm 112 in coordinate relationship with the other movements necessary to effect a workpiece interchange between the storage spindle 80 and the workpiece operating spindle 41. To simplify an understanding of operation of the velocity control cam 198, it seems advantageous to describe the rate control through the initial 90° movement of the work change arm from vertical parked position to initial engaged position; then proceed with description of the rate control of the work change arm through the next 180° for actually interchanging the position of the fixture rings; and finally describe rate control of the work change arm through the last 90° for returning the work change arm 112 to its vertically parked position between the two spindles.

As hereinbefore explained, the condition actually illustrated in FIG. 7 shows the work change arm 112 after being pivotally moved 90° in a clockwise direction, as viewed from the front, into engagement with the fixture rings 103 and 102 respectively. At the start of the cycle as indicated, the fixture ring 103 is carried by the storage spindle 80 and the fixture ring 102 is carried by the workpiece spindle 41. For effecting the proper directional and rate controlled movement of the change arm motor 260, a solenoid controlled valve 282 is operative to transmit pressure fluid from a high-pressure fluid supply line 283. The high-pressure control valve 282 is operated in parallel with a solenoid control 286 which is connected to selectively interconnect either the value orifice 244 or valve orifice 243 of the rate control valve 241 which is selectively controlled by the velocity control cam 198. The motor control valve 282 is operative to transmit pressure fluid from a line 283 to effect selective directionally controlled rotation of the motor 260 and to transmit the return flow of fluid from the motor to an equalizing control valve 287. The latter valve 287 performs a continuous equalizing function on the return flow of fluid from the motor to the valve 241 which is controlled by the velocity control cam 198. Rate control of the motor 260 for controlling velocity of the arm 112 in any of its three modes of operation, as explained in FIG. 4G, is controlled by back pressure of fluid through the valve 241 as determined by the velocity control cam 198.

To effect the timing sequence of the rate control of the work change arm 112 as schematically illustrated in FIGS. 4G and 7, there is provided the control valve illustrated in FIGS. 8 to 8C inclusive. As shown in FIG. 8, the control valve 241 comprises a valve body 290 having a pair of horizontally disposed circular openings 291 and 292 respectively. A tubular valve sleeve 295 extends through approximately one-half the axial length of the lower circular opening 291 and is fixedly pinned therein as indicated in FIG. 8. The tubular sleeve 295 contains the fluid passing rectangular orifices 247 and 248 which are selectively connectable to transmit fluid from the pivotally rotatable fluid control valve orifice 243 and 244. To do this, the rectangular orifices 247 and 248 in the sleeve 295 are in fixed, radial alignment with fluid passing orifices 297 and 298 contained in the wall between the circular openings 291 and 292. The tubular valve sleeve 295 is provided with a circular opening adapted to pivotally receive the circular rate control valve 241. As illustrated in FIG. 8, the tubular rate control valve 241 contained a small rate control aperture or orifice 243 and a large rate control orifice 244 respectively adapted to control the flow of hydraulic fluid between a central circular valve cavity 299 within the pivotal valve 241 to one or the other of the rectangular orifices 243 or 244, depending upon the axially adjusted position of the flow control valve 286 carried within the upper circular opening 292. For selectively controlling velocity, the tubular rate control valve 241 is provided with a rightward end 302 extending axially outward through a suitable circular opening formed in a vertical wall member 303 fixedly secured to the rightward end of the valve body 290 and forming a closure for the rightward ends of circular openings 291 and 292. A radial arm 305 secured to the rightward end 302 of the pivotal valve body 241 is engaged by the cam roller 238 which is directly engaged by the periphery of the symmetrical velocity control cam 198, as will hereinafter be explained in connection with FIG. 6. A torsion spring 304 engaging a non-rotatable wall member 306 engages the radial arm 305 in a manner to continously urge the cam roller 238 into engagement with the velocity control cam 198. Selective pivotal movement of the tubular body 241 in response to limited pivotal movement of the cam roller 238 as determined by the velocity control cam 198 in turn effects selective pivotal movement of the rate control orifice 243 and 244 to effect control of the fluid passing from the central circular cavity 299 within the valve 241 relative to the fixed rectangular orifices 247 and 248 contained in the tubular sleeve 295.

The axial position of the tubular control valve 286 relative to the fixed, fluid passing rectangular valves 247 and 248 depends upon which rotational cycle is being operated. As shown in FIG. 8, a left vertical wall member 307 is fixedly secured to the leftward end of the valve body 290 in a manner to operatively enclose the leftward end of the circular openings 291 and 292 formed therein. Whenever the workpiece change arm 112 is operated in either its first or third rotational cycles, a spring 309 operates to bias the valve 286 rightwardly within the upper circular valve body opening 292 to the axial position illustrated in FIG. 8. The spring 309 is seated at its leftward end within a circular opening formed in the left end wall member 307 and extends rightwardly within a horizontally aligned circular opening 310 formed in the axially movable tubular switch control valve 286. During the first and third rotational cycles, therefore, the spring 309 maintains the valve 286 in its extreme rightward position in a manner to align an annular valve groove 312 formed therein between the fixed aperture 297 and an upper fluid line 314.

During the second cycle of rotational movement, a solenoid 315 is energized to effect downward movement of an associated valve spool, thereby transmitting hydraulic fluid from an inlet pressure line via the downwardly urged valve spool 316 and transmit pressure fluid to an inlet line 318 formed in the rightward raw member 303 of the control valve 241. Pressure fluid admitted to the inlet line 318 effects leftward movement of the axially movable control valve 286 for reconnecting the annular valve groove 312 between the fluid passing aperture 298 and a fluid line 320.

As shown and described in FIGS. 8 to 8C inclusive, there is provided a biaxial control valve having the pivotal valve spool 241 disposed in a predetermined metering relationship to the axially movable control valve 286. With the valve 286 in resiliently biased rightward position as shown in FIG. 8, the valve spool 241 is selectively pivotal from an angular position in which no fluid is passed from the central valve opening 299 via the valve orifice 243 and thence through the fixed rectangular openings 247, 297 to the tubular annular groove 312. A selectively metered flow of hydraulic fluid is then passed from the inlet cavity 299 to the annular valve groove 312 as effected by predetermined pivotal movement of the valve spool 241 in response to engagement of the velocity control cam with the cam roller 238.

In a similar manner, energization of the solenoid 315 effects fluid actuated leftward movement of the valve 286 for aligning the annular valve groove 312 in the leftwardly moved valve 286 between the larger, pivotal control valve orifice 244 and the interconnecting rectangular orifices to the annular valve groove.

As hereinbefore explained with reference to the velocity chart in FIG. 4G, it will be readily apparent that each of the three different rotational cycles of movement of the workpiece arm 112 comprise an accelerating and a decelerating portion as selectively controlled by the velocity control cam. Thus, there are in effect a total of six different velocity controlled segments of movement of the workpiece change arm 112. In other words, two different velocity control segments of movement are provided in each of the three distinct rotational cycles of movement of the workpiece change arm 112.

In FIG. 6 there is provided a timing diagram to better illustrate the functional or operational relationship between the velocity control cam 198, the pivotal flow control valve 241, and the axially movable orifice selection valve 286. The various interconnected parts are schematically illustrated in FIG. 6 to more clearly explain the mode of operation of the velocity control cam 198. Reading from the bottom to the top of FIG. 6, there are shown eight different conditions of functional operation of the velocity control cam including FIGS. 6A to 6H inclusive. In each line, the velocity control cam 198 is illustrated as engaging the cam roller 238 carried by the radial arm 305 which is connected to effect selective pivotal movement of the valve spool 241. As hereinbefore explained with reference to FIG. 8, the pivotal movement of the resiliently biased valve spool 241 is effected by rotational movement of the velocity control cam 198. As shown in FIG. 6A, the cam roller is resiliently biased to extreme leftward position engaging a central indented portion of the velocity control cam 198. With this condition existing, the small adjustable orifice 243 contained in the pivotal valve 241 is completely disengaged from the fixed rectangular orifice 247 operatively associated therewith. In other words, with the condition illustrated in 6A, the axially movable control valve 286 is axially biased to its rightward position, as shown in FIG. 8, for moving the fixed rectangular orifice 247 shown therein into alignment with the orifice 243, as soon as the latter is pivoted angularly into a fluid passing position.

As viewed in FIGS. 6A to 6H inclusive, it will be understood the velocity control cam 198, cam follower 238, radial arm 305 and pivotal valve spool 241 are viewed from the rear of the machine. In other words, from the cycle start position illustrated in FIG. 6A, the control cam 198 is rotated in a clockwise direction to effect angular movement of the cam roller 238 in a counterclockwise direction to effect counterclockwise rotation of the pivotal valve spool 241. Thereupon, the small valve control orifice 243 is rotated in a corresponding counterclockwise direction to effect a gradually increasing transmission of hydraulic fluid to the fixedly positioned rectangular orifice 247 and the annular valve spool groove 312 positioned in the rightwardly biased control valve 286. It will be understood the gradual increase flow of fluid between the smaller orifice 243 and fixed rectangular orifice 247 effects a gradual increase in rate until maximum velocity is reached at the 45° position as illustrated in FIG. 6B. To show the metering effect provided between the adjustable orifice 243 and the fixed orifice 247, an intermediate position is illustrated in dotted form at FIG. 6AA. Continued clockwise rotation of the velocity control cam 198 effects continued counterclockwise pivotal movement of the cam roller 238 and valve spool 241 to the position illustrated in FIG. 6C. During the inital 90° approach segment of movement, it should be noted that the control valve 286 is resiliently maintained in its rightward position by the spring 309, FIG. 8, in order to maintain the axially movable tubular axis 247 in alignment with the pivotal orifice 243 as shown in FIG. 6B. Therefore, solenoid 315 is not energized until after the pivotal control valve 241 has been rotated into the counterclockwise position illustrated in FIG. 6C. In other words, the pivotally adjustable valve orifice 243 is moved completely out of engagement to the tubularly aligned fluid passing opening 247 to effect complete deceleration of the associated workpiece member before the rectangular aperture 247 is disconnected and the axially spaced aperture 248 is connected to pass fluid. Initially therefore the rate control condition illustrated in FIG. 6C shows the complete deceleration of the work change member as the arm is moved into engagement with the associated workpieces. Therefore, the conditions illustrated in the views 6C to 6G inclusive illustrate the operation of the velocity control cam to control the rate of movement of the work change arm during the 180° of workpiece arm rotation to effect the actual workpiece interchange. As shown in FIG. 6, this covers rotation of the workpiece change member 198 from the 90° position to the 270° position.

As hereinbefore explained, the solenoid 315 shown in FIG. 8 is energized to effect operation of the associated valve to transmit high pressure fluid to the line 318 thereby effecting hydraulically actuated leftward movement of the control vale 286. Thereupon, the annular valve groove 312 is moved leftwardly to render the small aperture 243 disconnected and the large aperture 244 of the valve 241 connected for controlling velocity during the interchange. Either aperture 243 or 244 may be formed in the shape of a slot. As hereinbefore explained, these relationships are accomplished by aligning the annular valve groove 312 between the fixed rectangular aperture 248 and the fluid line 320. As illustrated in FIG. 6C, the pivotal valve spool is in direct alignment above the rectangular aperture 248 conditioned for downward movement relative thereto upon continued clockwise rotation of the velocity control cam 198. Upon such downward pivotal movement of the valve spool 241 in the direction indicated, the flow of fluid into the fixed rectangular orifice is gradually increased until the aperture 244 is positioned to supply a full flow of fluid to the fixed aperture 248 for achieving the peak velocity at the 135° position. During continued clockwise rotation of the control cam 198, peak volocity if maintained through the 180° and 225° positions of the workpiece change arm.

Upon movement of the control cam from the 225° to the 270° positions, it will be apparent that the large rectangular aperture 244 is gradually moved out of engagement with the fixed aperture 248 although the operative alignment is maintained until the pivotal valve spool 241 is moved into the full 270° position as schematically illustrated in G of FIG. 6. The velocity of the workpiece change arm 112 is gradually reduced from its peak velocity at 225° to zero velocity at 270°. At the 270° position, it will be recalled that the respective workpieces carried by the arm are moved into alignment with the retracted storage spindle 80 and workpiece operating spindle 41 as hereinbefore explained. After the interchanged workpieces have been moved into alignment with the spindles, the spindles are moved forwardly into reengagement with the interchanged workpieces. Subsequent to reengagement of the spindles 80 and 41 with the interchanged workpieces, the workpieces are fixedly clamped thereto by opertion of the power actuated chucks 186 and 187 illustrated in FIG. 7. After this has occurred, the solenoid 315 in FIG. 8 is deenergized permitting resiliently biased return of the associated valve spool to disconnect the pressure line from the valve inlet line 318 and reconnect the latter to tank, this condition being illustrated in FIG. 8. Thereupon, the valve spool 286 is resiliently returned to rightward position by the spring 309, reconnecting the annular valve groove 312 between the rectangular apertures 247, 297 and the fluid exhaust lines 314.

With this condition reestablished as illustrated in FIG. 6G, the small aperture 243 in the valve 241 is again aligned with the fixed rectangular orifice 247 to control the rate of the workpiece change arm as it is moved in a clockwise direction from the 270° position to the 180° position. Return movement of the workpiece change arm 112 is schematically illustrated upon continued rotation of the velocity control cam 198 in a counterclockwise direction from the 6G to 6H positions. The 6H position of the control cam 198 represents the peak velocity achieved at the 225° position on return movement of the work change arm 112 to parked position. It will be apparent that the control cam 198 continues to rotate in a counterclockwise direction to effect leftward pivotal movement of the cam roller 238 and corresponding continued downward pivotal movement of the associated pivotal control valve 241 to gradually and completely disconnect the small fluid passing aperture 243 from the fixed rectangular valve aperture 247. With these conditions completed, the work change arm 112 is returned to vertical parked position and the interchanged workpieces are clamped in the respective spindles 80 and 41.

Referring again to FIG. 7, it will now be assumed that the workpiece change arm 112 is in its vertical parked position between the storage spindle 80 and the workpiece spindle 41. The tubular support frame 75 for the workpiece spindle 80 has been pivoted forwardly to its horizontal position as hereinbefore explained and as illustrated in FIG. 7, and the workpiece spindle 41 has been moved axially in a manner to move the fixture ring 102 carried thereby into axial alignment with the fixture ring 103 carried by the horizontally positioned storage spindle 80. To effect such movement, the spindle 41 is rotatably journalled in a spindle headstock 31 mounted for selective horizontal movement upon horizontal ways 32 as illustrated in FIGS. 1 and 7. To effect power driven longitudinal movement of the headstock 31, the recirculating ball-type antifriction nut 36 carried within the spindle headstock 31 is operatively engaged by the rotatable screw 34. Toward its rearward end, the feed screw 34 is journalled to rotate in a bearing 328 carried within the stationary machine bed 30, shown in fragmentary form in FIG. 7. A gear 329 secured at the rearward end of the rotatable spindle head drive screw 34 is engaged by an intermeshing gear 330 rotatably driven by the motor 37. A solenoid control valve 334 is operative to connect a pressure supply line to actuate the hydraulic drive motor 37 for rotating a gear 330 in selective direction to effect the required longitudinal movement of the spindle headstock 31. Energization of the solenoid 335 effects forward movement of an associated valve spool to connect a pressure supply line for rotating a motor 37 in a direction to effect forward movement of the spindle headstock 31. Conversely, energization of a solenoid 336 effects upward movement of the associated spindle valve to effect reverse rotation of the motor 37 for effecting upward or rearward movement of the spindle headstock 31. With both solenoids 335 and 336 deenergized as illustrated in FIG. 7, the associated valve spool is in its central neutral position to stop motor rotation and retain the spindle headstock 31 in a predetermined horizontal alignment with the storage spindle 80. In other words, the solenoid controlled valve 334 is operative to selectively actuate the motor 37 for moving the spindle headstock 31 in the required direction to align the workpiece spindle 41 with the storage spindle 80.

At the start of a workpiece interchange cycle, both spindles 80 and 41 are moved into positions of horizontal axial alignment. The arm 112 is positioned in its vertical parked position between the spindles with pivot links 128 and 134 in rotatably retracted position by the linkage mechanism 123.

Solenoid 156 is energized to operate fluid actuator 130 and rod 155 forwardly, thereby pivoting toggle arms 167 and 168 to maintain wedges 142 and 143 retracted and compressing the actuating springs 158 and 159.

In addition, another control solenoid 354 is deenergized permitting resilient retraction of an associated valve spool 355 by a spring 356. With this condition, pressure fluid from the line 283 is transmitted through the upper line of the resiliently retracted valve spool 355 to a hydraulic line 359 connected to a piston actuator 360. Exhaust fluid from the actuator 360 is transmitted via a line 362 connected via the retracted valve spool 355 to tank. With piston actuator 360 operated as described, a stop pin 361 is axially extended to positively stop rotation of the arm 112 in its 90° engaged position. Conversely, solenoid 354 is energized to retract the stop pin 366, prior to effecting rotation of the arm 112 for interchanging workpieces.

As a last starting condition to effecting a workpiece interchange between the spindles, the workpiece spindle 41 is rotated into a predetermined angular position relative to the angular position of the storage spindle 80. Doing this requires that the solenoid 176 be deenergized to retain an associated valve spool 177 in resiliently retracted position by spring 363. At the same time, solenoids 365 and 366 are energized to extend the associated valve spools 369 and 370, thus compressing actuating springs 373 and 374. With valve spool 370 extended, pressure fluid is transmitted from pressure line 283 via a line in the spool to a pressure line 375 connected to urge the piston actuator 376 axially forward. The piston actuator 376 is carried within a nonrotatable axially movable machine member 377 that rotatably supports the servo member 386 for axial movement; the actuator 376 is connected via a return line 380 to exhaust via the now resiliently retracted valve spool 177. Actuator 376 effects corresponding axial downward movement of a flange 381 engaging an annular groove 382 in the rotatable servo drive member 386. Annular clutch teeth 388 driven by the servo member 386 are moved axially forward into driving engagement with intermeshing annular clutch teeth 389 formed on an enlarged upper portion of the spindle 41.

With the actuator 381 operated to urge the clutch teeth 388 downward into axial engagement with driven teeth 389, a servo control valve 391 carried by the member 377 is likewise moved axially downward. As schematically shown in FIG. 7, the laterally extending actuating plunger carried by the valve is moved into the annular path of movement of a stop member 392 fixedly secured to the enlarged portion of the spindle 41. The servo control valve 394 is actuated to energize the associated motor for actuating the servo drive mechanism to effect rotation of the servo member 386 at a predetermined slow rate. With the clutch teeth 388 and 389 now moved into axial engagement as described, the spindle 41 is rotated at a like slow rate until the fixture ring 102 carried thereby is moved into a predetermined angular position relative to the fixture ring 103 secured to the spindle 80. The proper angular position is effected upon annular movement of the stop 392 on the spindle 41 into predetermined operating engagement with the now engaged servo control valve 391. As soon as this occurs, the valve 391 is operative via a line 395 to actuate the servo control valve 394 for stopping the servo mechanism 49 with the spindle 41 in its proper angular position.

With the fixture rings 102 and 103 carried by the spindles 41 and 80 in horizontal axial alignment, a solenoid 341 is energized to effect downward movement of an associated valve spool 342 of the motor control valve 282. Downward movement of the energized valve spool 342 interconnects the high pressure supply line 283 via an upper valve spool line to a motor input line 344 for effecting rotation of the motor 260 in a direction to move the workpiece change arm 112 a distance of 90° in a clockwise direction into the engaged position illustrated in FIG. 7. To selectively control the rate of rotation of the motor 260 as hereinbefore explained, a rate control line 345 is interconnected via an exhaust line in the downwardly moved valve spool 342 to the common exhaust lines 348 and 349. The controlled flow of back pressure via the line 280 operates to control the rotation rate of the motor 260 as hereinbefore explained.

At the start of a cycle, no back pressure is available to the line 280 via the interconnecting line 349 and valve 287 to a line 351. This is due to the fact that the velociy control cam 198 is angularly positioned in such fashion as to completely disconnect both orifices 243 and 244 of the pivotal control valve 241 at the start of the cycle. To provide the necessary back pressure to the line 280 for initiating motor rotation, therefore, the line 348 is connected via a needle valve 352 to a line 353 connected to transmit exhaust fluid pressure to the tank. Sufficient back pressure is provided to the line 280 via the predeterminately adjusted needle valve 352 to initiate rotation of the motor 260 at the start of the cycle. As the arm member 112 begins to rotate in a clockwise direction due to the interconnected needle valve 352, the velocity control cam 198 begins to rotate in a manner to effect pivotal movement of the small valve 243 which is immediately interconnected to supply a predetermined back pressure to the line 351 for continuing rotation of the motor 260 at a gradually increasing velocity. Rotation of the workpiece change arm 112 continues through the 90° approach movement at a rate predeterminately controlled by rotation of the velocity control cam 198 effecting pivoatally controlled movement of the valve 241 as hereinbefore explained.

Likewise, during the 90° approach of the arm member 112, the pivotal links 128 and 134 carried thereby are moved into latching engagement with the respective fixture rings 103 and 102 carried thereby, as hereinbefore described with reference to FIG. 4. Upon arrival of the arm member 112 at the 90° position, it moves into positive positional engagement with the axially extended stop pin 366. Inasmuch as the pivotal links 128 and 134 have now been moved into positive clamping engagement with the respective fixture rings, the control system is sequenced to effect deenergization of the solenoid 354 permitting the spring 356 to effect resilient retraction of the associated valve spool 355. As this occurs, the line 164 is now connected to exhaust to permit resilient retraction of the fluid actuator 130. With the actuator 130 deenergized, the springs 158 and 159 in the arm member 112 effect axial forward movement of the extensible wedges 142 and 143 to their outwardly latched position, as illustrated in FIG. 7. As there shown, the wedges 144 and 143 are moved outwardly into positions for locking the pivotal links 128 and 134 into engagement with the respective fixture rings during the subsequent 180° pivotal interchange movement of the arm member 112.

After fixture rings 103 and 102 are fixedly clamped within the arm 112 as described, solenoids 172 and 173 are energized to axially retract the rods 178 and 179. As explained, axial retraction of the rods 178 and 179 effects pivotal disengagement of the pivotal jaws of the chucks 186 and 187 to release the spindles from the fixture rings. Then, solenoid 189 is energized to move valve spool 190 to its upward position and connect lines 192 and 193 to supply fluid pressure to fluid actuators 194 and 195. As schematically shown in FIG. 7, the actuators are respectively connected to the upper ends of rods 397 and 398 respectively secured to the axially movable spindle 80 and spindle headstock 31. With the chucks 186 and 187 now disengaged, the fluid actuators 194 and 195 are disposed to retract the spindles 80 and 41 a distance sufficient for the disengaged chucks to clear the respective fixture rings.

Next, solenoid 354 is energized to move valve spool 355 forward and connect pressure line 283 to the supply line 362 connected to retract piston 360 and the attached stop pin 361. After the stop pin 366 is retracted, the solenoid 341 is reenergized to again effect forward movement of the valve spool 342. Rotation of the motor 260 is again initiated in the same clockwise direction by pressure fluid through input supply line 344, and controlled back pressure via line 345 and the exhaust line in the downward valve spool 342 to exhaust line 280. The exhaust line 280 continues the controlled flow of back pressure to lines 348 and 349 as hereinbefore explained with the needle valve 352 connected to initiate rate controlled movement through 180°. Starting conditions for the 180° pivotal movement of the workpiece change arm 112 are analogous to the movement hereinbefore described in FIG. 6. As viewed from the rear of the machine in FIG. 6, the control cam rotates in a counterclockwise direction from the 90° to the 270° position for effecting the rate controlled pivotal interchange. To effectively control the rate, however, control valve 286 is actuated to connect the large aperture 244 in the control circuit as described in FIGS. 6 and 8.

As shown in FIG. 7, solenoid 315 is energized concomitantly with the reenergization of solenoid 341. Thereupon, the back pressure control line 351 is connected through the large valve control orifice 244 to the line 248 and the upwardly moved diagonal valve line to the line 353. During the next 180° rotation of the work change arm 112 in a clockwise direction, the cam 198 controls movement of the roller 238 and large valve orifice as described in FIGS. 6, 7 and 8. During this 180° interchange movement, position control solenoid 354 is deenergized to effect resilient retraction of the valve spool. As this takes place, pressure fluid is again transmitted by line 359 as shown in FIG. 7 to again extend the position controlling stop pin 361.

Upon rotational advancement of the arm member through the complete rate controlled movement of 180°, the position of the fixture rings 103 and 102 is interchanged relative to the still retracted spindles 80 and 41. In other words, the fixture ring 103 is now axially aligned with the retracted spindle 41 and the fixture ring 102 is aligned with the spindle 80. It will be apparent that this condition corresponds with the positions described in FIG. 5D. The sequence of the control then provides for deenergization of solenoid 341 with resiliently biased return of the valve spool 190 to its central neutral position shown in FIG. 7.

After this retracting solenoid 189 is deenergized, the spring 204 moves the valve spool 190 forward to effect axial forward movement of the retracted spindles 80 and 41 into driving engagement with the interchanged fixture rings 102 and 103 respectively. Reengagement is facilitated due to the fact that the drive teeth 224 and 225 at the forward ends of the spindles 80 and 41 are positioned in predetermined angular alignment with the intermeshing drive teeth 227 and 226 at the inner ends of the now interchanged fixture rings 102 and 103 respectively.

As soon as the spindles 80 and 41 are moved forwardly into reengagement with the interchanged fixture rings 102 and 103, solenoids 172 and 173 are both deenergized to effect resilient biased return movement of the valve spools 174 and 175 to the positions shown in FIG. 7. Pressure fluid then flows through lines 213 and 217 to effect axial forward movement of the rods 178 and 179. Such movement in turn effects forward pivotal reengagement of the power actuated chucks to securely clamp the interchanged fixture rings to the spindles.

Since the fixture ring interchange is now completed, the solenoid 354 is reenergized to retract the stop pin 361. Likewise, another solenoid 399 is energized to effect upward movement of valve spool 342 to effect motor rotation in the opposite direction for returning the workpiece change arm 112 to its vertical parked position. During counterclockwise return rotation of the change arm, pressure fluid from the line 283 flows through an orifice in the now upward valve spool to the motor control line 345. From the motor 260, rate control fluid is exhausted via the line 344 and thence through an orifice in the upward spool 342 to the line 280. Rate control during return movement to parked position is again effected by back pressure from the line 280 to the lines 348 and 349 as previously explained. In this return movement, however, solenoid 315 is deenergized to effect resilient return of the valve 286 to the position schematically shown in FIG. 7. Valve 286 again interconnects the exhaust line to line 247 rendering the small orifice 243 of pivotal valve 241 operative to control the rate of the arm 112 to vertical parked position.

Figure 9:
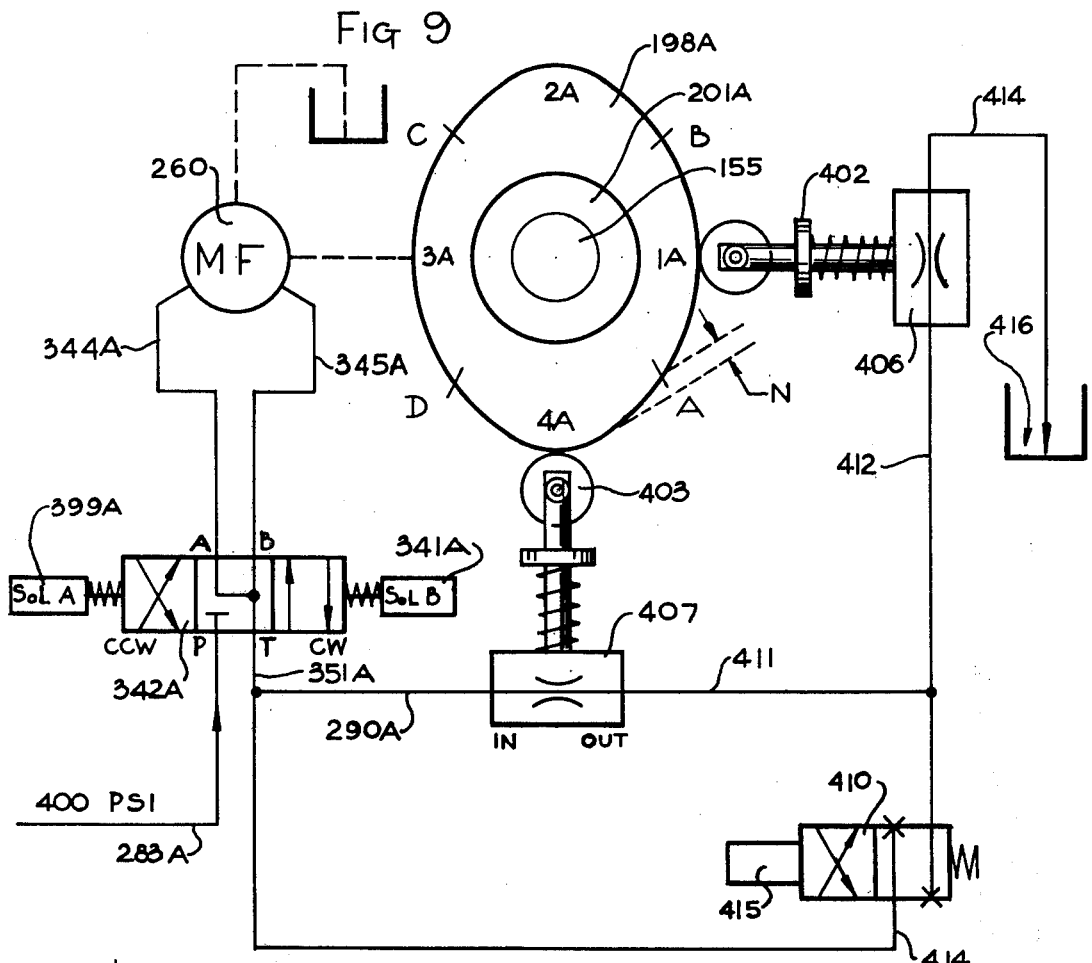
FIG. 9 is a simplified form of rate control for controlling an interchange cycle.

In FIG. 9, there is shown a velocity controller 198A of modified configuration secured to a tubular control shaft 201A connected to effect rotational control of a workpiece change arm 112 (not shown). It will be assumed the controller 198A is being viewed from the front of the machine and performs a control function analogous to the control cam 198 in FIG. 7. Likewise, the cam 198A operates in a similar fashion to control rotation of the shaft 201A and arm 112 through three distinct cycles of movement including a 90° approach, a 180° interchange, and a 90° return to parked position in the opposite direction. As previously explained in FIG. 7 the periphery of the cam 198 there shown is identified by the numerals 1, 2, 3 and 4 extending in a clockwise direction to relate the control effects to the three cycles of movement. The changing rates during the three cycles of movement are described in the timing sequence control diagram in FIGS. 6A to 6G inclusive, and the velocity control chart in FIG. 4G. As viewed from the rear of the machine in FIG. 7, the cam rotates from its "2" position in a couterclockwise direction to its "4" position to control the changing rates during a 180° cycle of interchange movement.

With the cam 198A angularly positioned as shown in FIG. 9, cam position "1A" is adjacent the cam roller 402, and cam position "4A" is adjacent the cam roller 403. The control positions shown are those existing at the start of a series of three control cycles; in other words with the change arm 112 controlled by the roller 198A in its vertical parked position. As hereinbefore explained also, other necessary control movements of the arm 112 and associated parts are selectively interspersed between the three cycles of rotational movement of the tubular shaft 201A as controlled by the gear 270. This arrangement is identical to that shown and described in connection with FIG. 7.

The initial 90° approach movement is effected by a clockwise rotation of the cam 198A to advance the "2A" position thereof adjacent the roller 402. During the next analogous 180° rotation of the shaft 201A, the cam 198A is rotated an additional 180° in a clockwise direction to angularly move the "4A" position thereof adjacent the roller 402. During 90° return movement to parked position, the cam 198A is pivoted 90° in a counterclockwise direction to move the "3A" position thereof adjacent the cam roller 402.

Although slightly different than the arrangement described in FIG. 7, cam 198A shown in FIG. 9 is symmetrical about a vertical centerline and also about a horizontal centerline. The two pressure compensated flow control valves 406 and 407 are volume adjustment controlled by the cam through the cam follower rollers 402 and 403. The valves 406 and 407 are displaced 90° relative to one another in the proper angular relationship to the cam 198A. The fixed displacement motor 260 is connected to rotate the shaft 201 in the proper direction to rotate the modified cam 198A secured thereto in the proper direction. Switching the flow control valve 407 into and out of the hydraulic circuit is controlled by a directional control valve 410.

Figure 9A:
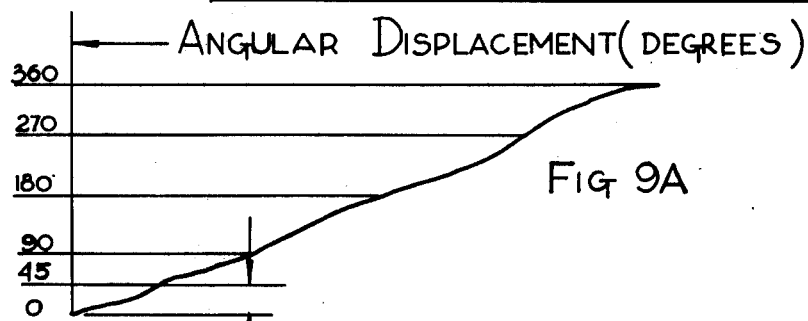
FIG. 9A illustrates the angular displacement of the velocity control cam of the simplified rate control in degrees; and, FIG. 9B illustrates the velocity control of the work of the simplified control during the 90° approach, the 180° work change cycle, and the 90° return movement to parked position.
Figure 9B:
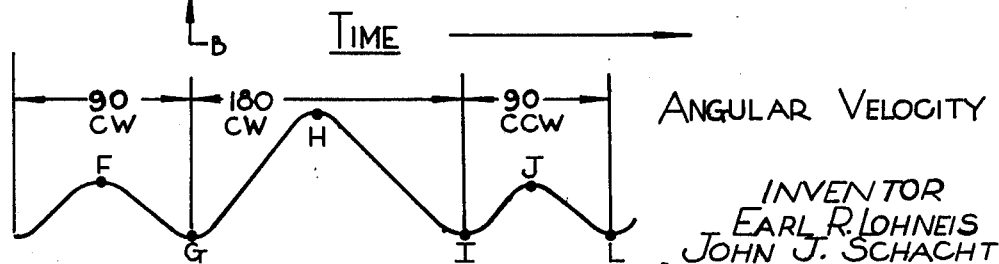

The work change cycle described comprises the three distinct rotational cycles, including the 90° approach, 180° interchange and 90° return. As further explained, the three rotational cycles are each preceded and followed by other types of movement necessary in the workpiece change sequence. With solenoid 341A energized, the motor 260 is rotated clockwise to effect the 90° approach movement. During this condition, fluid from the fixed displacement motor 260 is transmitted via the line 345A, the leftwardly moved valve spool 342A, to the lines 351A and 290A. Fluid flow continues from line 290A and the switchable flow control valve 407 lines 411, 412 and thence through the valve 406 to line 414. The latter is connected to exhaust 416 which is connected to return fluid to the hydraulic control system and supply line 283A in well-known manner. As the motor 260 rotates the cam 198A though the initial 90° approach, cam 198A controls the fluid flow rate through the two flow control valves. Since the two flow control valves 406 and 407 are connected in series, the valve with the smaller flow rate adjustment will control the hydraulic fluid. As the cam begins to rotate from its "1A" position in FIG. 9, valve 407 has a smaller flow rate adjustment and therefore is controlling the fixed displacement hydraulic motor 260. After the cam is rotated 45° clockwise from its position shown in FIG. 9, point 1A is moved into a midpoint position between the roller 402 and 403. After 45° advancement of the cam 198A, points A and B on the preiphery thereof are likewise advanced 45° to respectively engage the radially movalbe rollers 403 and 402. With the cam in its initial 45° clockwise position, the two flow control valves 407 and 406 are adjusted to provide the same hydraulic flow. The position of the cam 198A is at an angular displacement of 45° as shown in FIG. 9A and at an angular velocity of "F" magnitude as shown in FIG. 9B. As the cam continues to rotate in a clockwise direction to its initial 90° position, peripheral cam points "1A" and "1B" are respectively moved into positions adjacent the cam rollers 403 and 402. As the cam 198A advances from the 45° to the 90° position, the flow rate adjustment is less through the valve 406 than through the valve 407 and therefore the valve 406 then controls the fluid flow. At this time, the angular displacement of the cam 198A is now 90° as indicated in FIG. 9A, and the angular velocity is of "G" velocity, as indicated in FIG. 9B, very small, but greater than zero. With cam position "1A" advanced 90° to a position adjacent roller 403, the solenoid 391A is deenergized and the other workpiece change movements effected.

The next rotational cycle is the 180° interchange movement in a clockwise direction, beginning at the 90° position of the cam 198A and terminating at the 270° position. As viewed in FIG. 9, the "2A" position of cam 198A will be adjacent the cam roller 402. Pivotal advancement of the cam 198A effects pivotal advancement of the point "3A" to a position adjacent the roller 402. To initiate the interchange, solenoid 341A is reenergized to again start clockwise movement from the 90° to the 270° position. During this condition, however, the flow control path bypasses the flow control valve 407 in a manner that the angular velocity is controlled only by the flow control valve 406. This circuit is completed by energizing solenoid 415 to close valve spool 410 to complete a by-pass circuit from conductor 414 to conductor 412. As the cam 198A is rotated from 90° to 180°, the angular velocity of the cam is now at a predetermined maximum of "H" magnitude, FIG. 9A. As the cam continues to rotate from the 180° to the 270° position, the hydraulic flow rate decreases to "I" velocity, as indicated in FIG. 9A. The second rotational cycle is then completed with the respective workpieces carried by the arm 112 in interchanged position. Therefore, solenoid 341A and solenoid 315 are deenergized since the second rotational cycle is completed.

As previously explained, other portions of the control system are actuated to insert and secure the now interchanged workpieces into the spindles. After this, solenoid 399A is energized effecting rightward movement of the valve spool 342A to rotate the motor 260 in a counterclockwise direction. This third rotational cycle is identical to the first cycle, excepting that the direction of rotation is in the opposite direction. At completion of the second rotational cycle, point "4A" on cam 198A is adjacent roller 402, and point "3A" thereon is adjacent the spaced apart roller 403. From that position, the change arm 112 is rotated 90° in a direction returning it to vertical parked position. After energizing solenoid 399A, pressure fluid flows from line 283A via the rightward valve spool 342A, line 345A, moving motor 260 counterclockwise, and to the return line 344A. Fluid continues via the valve spool to lines 351A, 290A, and valve 407 to lines 411, 412 and valve 406 to create the same rate control. Although the angular displacement of cam 198A is from 270° to 360°, FIG. 9A, the angular velocity changes from "I" magnitude to a maximum of "T" magnitude and again returns to "L" magnitude, FIG. 9B. Angular velocity of the cam 198A is reduced to zero when the solenoid 399A is deenergized at completion of the third cycle. With the arm 112 now returned to vertical parked position between the interchanged fixture rings clamped in the spindles, cam 198A is rotatably displaced 180° from its starting position. In other words, point "3A" of cam 198A is positioned adjacent roller 402 at the completion of the first three rotational cycles of cam movement.

From the foregoing detailed description of the illustrative structure set forth herein to disclose the principles of the present invention, it is apparent that there has been provided an improved velocity control and coordinately operative automatic latching mechanism for a machine tool transfer mechanism.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, we hereby claim as our invention:

1. In a machine tool having a frame;
   a member receiving operating support and a member receiving storage support carried in spaced apart positions by said frame;
   a member gripping transfer arm pivotally movable from parked position to effect a bodily interchange of members between said supports;
   first power control means operative to pivot said transfer arm from said parked position into gripping engagement with the members respectively carried by said supports;
   second power control means operative to pivot said transfer arm in a transfer movement to bodily interchange the positions of the members gripped thereby between said supports to again be received in said supports in interchanged positions;
   third power control means operative to pivot said transfer arm to parked position; and,
   velocity control means connected to be selectively actuated by movement of said transfer arm and connected to effect gradual acceleration and gradual deceleration of said transfer arm as well as to regulate its uniform velocity between the acceleration and deceleration periods to control each of its three cycles of movement including approach, transfer and return movements.

2. In a transfer arm for transferring articles between two stations;
   a rotary transfer arm connected to be rotated by power for transferring the articles between said two stations; and,
   rate control means for regulating the rate of acceleration and deceleration of said transfer arm during the transfer movement as well as its uniform velocity between the acceleration and deceleration periods so that the transfer operation will be completed in minimum time without excessively straining the associated mechanical structure; and wherein said rate control means comprises a cam connected to move with said rotary transfer arm; and,
   a rate change means actuated by said cam to regulate the rate of rotation of said transfer arm at a predetermined varying rate during the entire transfer operation.

3. A transfer arm according to claim 2 including,
   a hydraulic motor connected to rotate said transfer arm in its transfer movement; and,
   said rate change comprises a hydraulic valve connected to control the flow of the pressure fluid that actuates said hydraulic motor and disposed to be actuated by said cam for regulating the rate of rotation of said transfer arm.

* * * * *